United States Patent
Cook et al.

(10) Patent No.: US 7,244,498 B2
(45) Date of Patent: Jul. 17, 2007

(54) NANOPARTICLES MODIFIED WITH MULTIPLE ORGANIC ACIDS

(75) Inventors: Ronald Lee Cook, Lakewood, CO (US); Silvia DeVito Luebben, Golden, CO (US); Andrew William Myers, Arvada, CO (US); Bryan Matthew Smith, Boulder, CO (US); Brian John Elliott, Superior, CO (US); Cory Kreutzer, Brighton, CO (US); Carolina Wilson, Arvada, CO (US); Manfred Meiser, Aurora, CO (US)

(73) Assignee: TDA Research, Inc., Wheat Ridge, CO (US)

(*) Notice: Subject to any disclaimer, the term of this patent is extended or adjusted under 35 U.S.C. 154(b) by 0 days.

(21) Appl. No.: 11/120,650

(22) Filed: May 3, 2005

(65) Prior Publication Data
US 2007/0098990 A1    May 3, 2007

Related U.S. Application Data

(63) Continuation-in-part of application No. 10/412,737, filed on Apr. 11, 2003, now Pat. No. 6,933,046, and a continuation-in-part of application No. 10/171,402, filed on Jun. 12, 2002, now Pat. No. 6,986,943, and a continuation-in-part of application No. 10/171,422, filed on Jun. 12, 2002, now Pat. No. 6,887,517.

(51) Int. Cl.
*B32B 5/66*    (2006.01)

(52) U.S. Cl. ........... 428/402; 428/403; 428/404; 428/405; 428/407; 427/214; 427/215; 427/220; 556/179

(58) Field of Classification Search ........... 428/402, 428/403, 404, 405, 407; 427/214, 215, 220; 556/179
See application file for complete search history.

(56) References Cited

U.S. PATENT DOCUMENTS 3,117,944 A    1/1964    Harrell
(Continued)

FOREIGN PATENT DOCUMENTS

DE    3122907    1/1983
(Continued)

OTHER PUBLICATIONS

U.S. Appl. No. 10/412,737, filed Apr. 11, 2003, Cook et al.
(Continued)

*Primary Examiner*—Leszek Kiliman
(74) *Attorney, Agent, or Firm*—Greenlee, Winner and Sullivan, P.C.

(57) ABSTRACT

Surface-modified nanoparticles of boehmite, and methods for preparing the same. Aluminum oxyhydroxide nanoparticles are surface modified by reaction with selected amounts of organic acids. In particular, the nanoparticle surface is modified by reactions with two or more different carboxylic acids, at least one of which is an organic carboxylic acid. The product is a surface modified boehmite nanoparticle that has an inorganic aluminum oxyhydroxide core, or part aluminum oxyhydroxide core and a surface-bonded organic shell. Organic carboxylic acids of this invention contain at least one carboxylic acid group and one carbon-hydrogen bond. One embodiment of this invention provides boehmite nanoparticles that have been surface modified with two or more acids one of which additional carries at least one reactive functional group. Another embodiment of this invention provides boehmite nanoparticles that have been surface modified with multiple acids one of which has molecular weight or average molecular weight greater than or equal to 500 Daltons. Yet, another embodiment of this invention provides boehmite nanoparticles that are surface modified with two or more acids one of which is hydrophobic in nature and has solubility in water of less than 15 by weight. The products of the methods of this invention have specific useful properties when used in mixture with liquids, as filler in solids, or as stand-alone entities.

34 Claims, 6 Drawing Sheets

First generation, multi-acid surface modified boehmite nanoparticle

U.S. PATENT DOCUMENTS

| | | | |
|---|---|---|---|
| 3,268,295 A | 8/1966 | Armbrust, Jr. et al. | |
| 3,411,876 A | 11/1968 | Michel et al. | |
| 3,411,877 A | 11/1968 | Michel et al. | |
| 3,515,689 A | 6/1970 | Brane et al. | |
| 3,899,624 A | 8/1975 | Southerland | |
| 3,901,845 A | 8/1975 | Newbould | |
| 3,977,476 A | 8/1976 | Cull | |
| 4,010,247 A | 3/1977 | Wassermann et al. | |
| 4,091,164 A | 5/1978 | Schwarz | |
| 4,169,014 A | 9/1979 | Goldberg | |
| 4,188,309 A | 2/1980 | Volker et al. | |
| 4,191,670 A | 3/1980 | Strauch | |
| 4,210,575 A | 7/1980 | Drake | |
| 4,211,667 A | 7/1980 | Yamada et al. | |
| 4,283,316 A | 8/1981 | Bonsignore | |
| 4,327,032 A | 4/1982 | Lohse et al. | |
| 4,346,184 A | 8/1982 | Drake | |
| 4,349,389 A | 9/1982 | Schofield | |
| 4,405,493 A | 9/1983 | Pippard | |
| 4,419,137 A | 12/1983 | Cayless et al. | |
| 4,420,341 A | 12/1983 | Ferrigno | |
| 4,428,774 A | 1/1984 | Drake et al. | |
| 4,459,155 A | 7/1984 | Cayless | |
| 4,474,607 A | 10/1984 | Goldie et al. | |
| 4,496,714 A | 1/1985 | Murata et al. | |
| 4,518,429 A | 5/1985 | Drake et al. | |
| 4,532,072 A | 7/1985 | Segal | |
| 4,561,896 A | 12/1985 | Drake et al. | |
| 4,594,369 A | 6/1986 | Othen | |
| 4,643,769 A | 2/1987 | Othen | |
| 4,676,928 A | 6/1987 | Leach et al. | |
| 4,687,595 A | 8/1987 | Leach et al. | |
| 4,738,720 A | 4/1988 | Eckler et al. | |
| 4,739,007 A | 4/1988 | Okada et al. | |
| 4,749,550 A | 6/1988 | Goldie et al. | |
| 4,764,495 A | 8/1988 | Rice | |
| 4,788,176 A | 11/1988 | Wieserman et al. | |
| 4,795,492 A | 1/1989 | Othen | |
| 4,897,439 A | 1/1990 | Rau et al. | |
| 4,900,767 A | 2/1990 | Rice | |
| 4,929,589 A | 5/1990 | Martin et al. | |
| 4,952,634 A | 8/1990 | Grossman | |
| 4,983,566 A | 1/1991 | Wieserman et al. | |
| 4,992,199 A | 2/1991 | Fletcher | |
| 5,013,798 A | 5/1991 | Hoxmeier et al. | |
| 5,093,403 A | 3/1992 | Rau et al. | |
| 5,141,656 A | 8/1992 | Rountree | |
| 5,212,261 A | 5/1993 | Stierman | |
| 5,352,342 A | 10/1994 | Riffe | |
| 5,418,298 A | 5/1995 | Laine et al. | |
| 5,426,916 A | 6/1995 | Grigsby et al. | |
| 5,478,451 A | 12/1995 | Riffe | |
| 5,489,447 A | 2/1996 | Kramer et al. | |
| 5,536,583 A | 7/1996 | Roberts et al. | |
| 5,576,468 A | 11/1996 | Lubowitz | |
| 5,593,654 A | 1/1997 | Decker, Jr. et al. | |
| 5,593,781 A | 1/1997 | Nass et al. | |
| 5,606,087 A | 2/1997 | Roberg et al. | |
| 5,612,009 A | 3/1997 | Fetzer et al. | |
| 5,814,407 A | 9/1998 | Richard et al. | |
| 5,902,891 A | 5/1999 | Sangokoya et al. | |
| 5,935,275 A | 8/1999 | Burgard et al. | |
| 6,030,599 A | 2/2000 | Noweck et al. | |
| 6,068,879 A | 5/2000 | Pasch | |
| 6,106,901 A | 8/2000 | Song et al. | |
| 6,132,808 A | 10/2000 | Brown et al. | |
| 6,190,731 B1 | 2/2001 | Tecle | |
| 6,207,130 B1 | 3/2001 | Kareiva et al. | |
| 6,224,846 B1 | 5/2001 | Hurlburt et al. | |
| 6,228,903 B1 | 5/2001 | Beall et al. | |
| 6,322,890 B1 | 11/2001 | Barron et al. | |
| 6,361,592 B1 | 3/2002 | Song et al. | |
| 6,369,183 B1 | 4/2002 | Cook et al. | |
| 6,383,271 B1 | 5/2002 | Schmidt | |
| 6,383,414 B1 | 5/2002 | Pasch | |
| 6,537,665 B2 | 3/2003 | O'Connor et al. | |
| 6,602,933 B2 | 8/2003 | Tang et al. | |
| 6,887,517 B1 * | 5/2005 | Cook et al. | 427/214 |
| 6,933,046 B1 * | 8/2005 | Cook | 428/402 |
| 6,986,943 B1 * | 1/2006 | Cook et al. | 428/402 |

FOREIGN PATENT DOCUMENTS

| | | |
|---|---|---|
| EP | 0 236 497 | 9/1987 |
| EP | 0 252 669 | 1/1988 |
| EP | 0 366 727 | 5/1990 |
| EP | 0 385 880 | 9/1990 |
| EP | 0 576 695 | 1/1994 |
| EP | 0 690 933 | 1/1996 |
| EP | 0 985 737 | 3/2000 |
| EP | 0 995 816 | 4/2000 |
| GB | 2039913 | 8/1980 |
| WO | WO 87/01622 | 3/1987 |
| WO | WO 91/19607 | 12/1991 |
| WO | WO 93/21197 | 10/1993 |
| WO | WO 94/21843 | 9/1994 |
| WO | WO 96/26240 | 8/1996 |
| WO | WO 97/23288 | 7/1997 |
| WO | WO 98/35917 | 8/1998 |
| WO | WO 99/50203 | 10/1999 |
| WO | WO 00/09578 | 2/2000 |

OTHER PUBLICATIONS

U.S. Appl. No. 10/171,402, filed Jun. 12, 2002, Cook et al.

Andrianov et al. (1958) "Synthesis of New Polymers with Inorganic Chains of Molecules," *J. Polym. Sci.* :512-524.

Bauer et al. (1985) "Epoxy Resins," In; *Applied Polymer Science*, II Edition, Tess et al. Ed., ACS Symp. Er. 285, ACS, Washington, pp. 931-961.

Beall, G.W. (2001) "New Conceptual Model for Interpreting Nanocomposite Behaviors," In; *Polymer-Clay Nanocomposites*, Pinnavaia et al. eds., John Wiley & Sons, Incorporated, Chichester, England, pp. 267-279.

Cai et al. (1985) "Tranmetalation of Tetranuclear Copper Complexes. 3. Effects of Ligands (L=$N,N$-Diethylnicotinamide or Ethyl Nicotinate; X= Cl or Br) on the Properties of $[LNi(H_2O)X]_4X_4$, $(_{\mu 4}$-O$)[LNi(H_2O)]_4X_4$, and $[LCuNi(H_2O)X_2]_2Y_2$ (Y=O or $CO_3$) Complexes in Aprotic Solvents," *Inorg. Chem* 24:1701-1705.

Callender et al. (1997) "Aqueous Synthesis of Water-Soluble Alumoxanes: Environmentally Benign Precursors to Alumina and Aluminum-Based Ceramics," *Chem. Mat.* 9(11):2418-2433.

Cohen et al. (1995) "Replacements for Chromium Pretreatments on Aluminium," *Corrosion* 51(1):71-78.

Cowie, J.M.G. (1993) *Polymers: Chemistry & Physics of Modern Materials*, 2nd Edition, Blackie Academic Professional, Great Britain, pp. 8-9 and pp. 210-214.

Cowie, J.M.G. (1973) *Polymers: Chemistry and Physics of Modern Material*, Intertext Books, Aylesbury, pp. 1-23.

Dagani, R. (1999) "Putting the 'Nano' in Composites," Jun. 7 C&EN, 25-27.

Davies et al. (1984) "Transmetallation Reactions of Tetranuclear Copper (II) Complexes. I. Crystal and Molecular Structure of an Intermediate and a Final Product of Reaction of Di-μ-oxo-tetra[chloro(DENC)copper(II)], 9DENC=$N,N$-diethylnicotinamide) with $[Zn(N_2S_2]$, ($N_2S_2$=diacetyl-bis-hydrazonato-S-methyl-carbodititihiolate) in Aprotic Solvents," *Inorg. Chim. Acta.* 84:41-50.

Davies et al. (1986) "Transmetalation of Tetranuclear Copper Complexes. 7. Spectral Evidence for the Substiochiometric Transmetalation of $(_{\mu 4}$-O$)[(DENC)Cu]_4X_6$ Complexes (DENC=$N,N$-Diethylnicotinamide; X=Cl or Br) by a $Ni(NS)_2$ Reagent," *Inorg. Chem.* 25:2269-2271.

deWit et al. (1997) "Evaluation of Coatings—A Total System Approach," *Materials Science Forum* 247:69-82.

Ellis, B. (1993) *Chemistry and Technology of Epoxy Resins*, Blackie Academic and Professional, Chapters 1,2,4,&7, pp. 1-71, 117-143,206-255.

El-Toukhy et al. (1984) "Transmetalation Reactions of Tetranuclear Copper(II) Complexes. 2. Stiochiometry and Products of Reaction of [(DENC)CuCl]$_4$O$_2$," *J. am. Chem. Soc.* 106:4596-4605.

Frankel et al. (2001) "Inhibition of Al Alloy Corrosion by Chromates," *Electrochem Soc. Interface* 10(4):34-38.

Gusev et al. (2001) "Rational Design of Nanocomposites for Barrier Applications," *Adv. Mater.* 13(21):1641-1643.

Harlan et al. (1997) "Yttrium-Doped Alumoxanes: A *Chimie Douce* Route to Y3Al5O12 (YAG) and Y4Al2O9 (YAM)," *Adv. Mater.* 9(1):68-71.

Hauk et al. (1977) "Thermal Conductivity of Epoxy Resin-Aluminum (0 to 50%) Composites," *J. Mater. Sci. Lett.* 12:1689-1691.

Jones et al. (1977) "Carhboxylate-Alumoxanes: Environmentally Benign Precursors for Developing Aluminum Based Ceramic Membranes and Filters," 9$^{th}$ CIMETC, World Ceramic Congress, pp. 413-420.

Jullien et al. (1996) "The Microwave Reaction of Phenyl Glycidyl Ether with Aniline on Inorganic Supports: A Model for the Microwave Crosslinking of Epoxy Resins," *Polymer* 37(15):3319-3330.

Kareiva et al. (1996) "Carboxylate-Substituted Alumoxanes as Processable Precursors to Transition Metal-Aluminum and Lanthanide-Aluminum Mixed-Metal Oxides: Atomic Scale Mixing Via a New Transmetalation Reaction," *Chem. Mater.* 8(9):2331-2340.

Kasemann et al. (1994) "Coatings for Mechanical and Chemical Protection Based on Organic0Inorganic Sol0Gel Nanocomposites," *New J. Chem.* 18(10):1117-1123.

Katz et al. (1978) *Handbook of Fillers and Reinforcements for Plastics*, Van Nostrand Reinhold Company, pp. 11-50.

Kimura et al. (1990) "Coordination Structure of the Aluminum Atoms of Poly(Methylaloxane), Poly(Isopropoxylaloxane) and Poly[(Acyloxy)Alaxane]," *Polyhedron* 9(2-3):371-376.

Koide et al. (1995) "[Al$_5$(Bu)$_5$($_{\mu 3}$-O)$_2$($_{\mu 3}$-OH)$_2$($_\mu$-O$_2$CPh)$_2$]: A Model for the Interaction of Cabrboxylic Acids with Boehmite," *Organometallics* 14:4026-4029.

Koide et al. (1996) "Alumoxanes as Cocatalysts in the Palladium-Catalyzed Copolymerization of Carbon Monoxide and Ethylene: Genesis of a Structure-Activity Relationship," *Organometallics* 15(9):2213-2226.

Kojima et al. (1993) "Mechanical Properties of Nylon 6-Clay Hybrid," *J. Mater. Res.* 8:1185-1189.

Kroschwitz et al. (1996) *Encyclopedia of Polymer Science and Engineering*, vol. 6, *Emulsion Polymerization to Fibers, Manufacture*, John Wiley and Sons, pp. 322-382.

Landry et al. (1993) "Siloxy-Substituted Alumoxanes: Synthesis from Polydialklsiloxanes and Trimethylaluminum, and Applications as Aluminosilicate Precursors," *J. Mater. Chem.* 3(6):597-602.

Landry et al. (1996) "From Minerals to Metals: Synthesis of Alumoxanes from the Reaction of Boehmite with Carboxylic Acids," *J. Mater. Chem.* 5(2):331-341.

LeBaron et al. (1999) "Polymer-Layered Silicate Nanocomposites: An Overview," *Applied Clay Sci.* 15:11-29.

MacInnes et al. (1993) "Chemical Vapor Deposition of Gallium Sulfide: Phase Control by Molecular Design," *Chem. Mater.* 5(9):1344-1351.

MacInnes et al. (1993) "Indium Tert-Butylithiolates as Single Source Precursors for Indium Sulfide Thin Films: Is Molecular Design Enough," *J. Organometallic Chem.* 449:95-104.

Mansfeld et al. (1991) "Development of Stainless Aluminu8m," *J. Electrochem. Soc.* 138(12):L74-L75.

Nakamae et al. (1992) "Studies on Mechanical Properties of Polymer Composites by X-Ray Diffraction. 3. Mechanism of Stress Transmission in Particulate Epoxy Composite by X-Ray Diffraction," *Polymer* 33(13):2720-2724.

Obrey et al. (2002) "A Chemically Functionalized Carboxylate-Alumoxane Nanoparticle Support for Olefin Polymerization Catalysts," *Macromol.* 35:1499-1503.

Pasynkiewics, S. (1990) "Alumoxanes: Synthesis, Structures, Complexes and Reactions," *Polyhedron* 9(2-3):429-453.

Scantlebury et al. (1999) "A Sol-Gel Derived Anti-Corrosion Pigment," Advances in Corrosion Protection by Organic Coating, J. Corrosion Science and Engineering, Abstract 22, Cambridge, Sep. 1999.

Schmidt et al. (1986) "Chemistry and Applications of Inorganic-Organic Polymers," *Mat. Res. Soc. Symp. Proc.* 73:739-750.

Schmidt et al. (1995) "Inorganic-Organic Hybrid Coatings for Metal and Glass Surfaces," *Am. Chem. Soc.* :331-347.

Schmidt et al. (1994) "Sol-Gel-Based Inorganic-Organic Composite Materials," *Am. Chem. Soc.* :183-194.

Shahid et al. (2001) "Use of Carboxylate-Alumoxanes as Functionalized Cross-Linking Agents in the Preparation of Composite Resin Materials," ACS joint Southeast-Southwest Regional Meeting, Dec. 6-8.

Shahid et al. (2000) "Use of Carboxylate-Alumoxanes as Functionalized Cross-Linking Agents in the Preparation of Composite Resin Materials," 221$^{st}$ ACS National Meeting, San Diego, CA, Apr. 1-5.

Stevens, M. (1990) *Polymer Chemistry, An Introduction*, Second Edition, Oxford University Press, pp. 374-379.

Thayer, A.M. (2001) "Nanotech Offers Some There, There," Nov. 26, C&EN, 13-16.

Uchida et al. (1999) "Thermochemical Study of Adsorption Behavior of Polyacrylic Acid on Alumina Powder Surface," *Key Engineering Mat.* 161-163:133-136.

Usuki et al. (1993) "Synthesis on Nylon 6-Clay Hybrid," *J. Mater. Res.* 8:1179-1184.

Vogelson et al. (1998) "Inorganic-Organic Hybrid and Composite Materials Using Carboxylate-Alumoxanes," Proceedings of the 9$^{th}$ Cimtec-World Ceramics Congress, Jun. 14-19, pp. 499-506.

Vogelson et al. (2000) "Inorganic-Organic Hybrid and Composite Resin Materials Using Carboxylate-Alumoxanes as Functionalized Cross-Linking Agents," *Chem. Mater.* 12(3):795-804.

Vogelson et al. (2000) "Fiber reinforced Epoxy Resin Composite Materials Using Carboxylate Alumoxanes as Cross Linked Agents," *Mat. Res. Soc. Symp. Proc.* 581:369-374.

Vogelson et al. (1999) "Epoxy Resin Materials Using Functionalized Carboxylate-Alumoxanes as Cross-Linked Agents," ACS Meeting, Joint 55$^{th}$ Southwest/15$^{th}$ Rocky Mountain Regional Meeting, El Paso, Texas, Oct. 21-23.

Vogelson et al. (1999) "Inorganic-Organic Epoxy Resin Materials Using Functionalized Carboxylate-Alumoxanes as Cross-Linking Agents," ACS Meeting, New Orleans, Louisiana, Aug. 21-26.

Vogelson et al. (1998) "Inorganic-Organic Epoxy Composite Materials Using Carboxylate-Alumoxanes," ACS Meeting, Dallas, Texas, Mar. 29-Apr. 2.

Vogelson et al. (1999) Slides Presented at 0$^{th}$ Annual World Ceramics Conference in Florence, Italy, Jun.

Whitesides et al. (1991) "Molecular Self Assembly and Nanochemistry: A Chemical Strategy for the Synthesis of Nanostructures," *Science* 254:1312-1319.

Yano et al. (1993) "Synthesis and Properties of Polyimide-Clay Hybrid," *J. Polym. Sci. A* 31:2493-2498.

Yoldas, B. (1975) "Alumina Gels that Form Porous Transparent Al$_2$O$_3$," *J. Mater. Sci.* 10:1856-1960.

(2002) "Filler Surface Modification with Organic Acids," *Plastics, Additives and Compounding* 2(12):26-29.

\* cited by examiner

NANOPARTICLES MODIFIED WITH MULTIPLE ORGANIC ACIDS

CROSS-REFERENCE TO RELATED APPLICATIONS

This application is a continuation-in-part of U.S. patent application Ser. No. 10/412,737, filed Apr. 11, 2003, now U.S. Pat. No. 6,933,046, issued Aug. 23, 2005; Ser. No. 10/171,402, filed Jun. 12, 2002, now U.S. Pat. No. 6,986,943, issued Jan. 17, 2006; and Ser. No. 10/171,422, filed Jun. 12, 2002, now U.S. Pat. No. 6,887,517, issued May 3, 2005, all of which applications are incorporated in their entirety by reference herein.

STATEMENT REGARDING FEDERALLY FUNDED RESEARCH AND DEVELOPMENT

This invention was made, at least in part, with funding from the Department of Defense, Contract No. N68335-02-C-0024, the Department of Energy, Contracts No. DE-FG03-00ER82928 and No. DE-FG03-01ER83309, National Science Foundation Contracts No. DMI-0214732 and No. DMI-0214769, NASA Contract No. NAS 9-03017, Environmental Protection Agency Contract No. 68-D-02-060, National Institute of Health Contract No. 1R43DE13767-01. Accordingly, the U.S. government may have certain rights in this invention.

BACKGROUND OF THE INVENTION

Organic carboxylic acids have long been known to react with inorganic particulate minerals, including alumina and other aluminum oxyhydroxides, to produce fillers that disperse more easily than the base inorganic particulate in paints, plastics, rubbers, adhesives, caulks and other composites materials. For example, U.S. Pat. No. 4,420,341 (Ferrigno, 1983) describes surface modified fillers with improved properties that comprise a particulate mineral, an organic acid, an antioxidant, and a liquid agent. U.S. Pat. No. 4,283,316 (Bonsignore 1981) describes the modification of alumina hydrates with liquid fatty acids to make them compatible with thermoplastic polymers, and U.S. Pat. No. 4,191,670 describes the treatment of mineral fillers with a mixture of saturated and unsaturated aliphatic acids. However, the above cited patents do not specifically address the technical challenges of working with nanoparticle materials that have at least one dimension of less than 100 nm. [Also see for example "Filler surface modification with organic acids," *Plastics, Additives and Compounding* Volume 2, Issue 12, December 2000, Pages 26–29, Elsevier Science and "Thermochemical study of Adsorption Behavior of Polyacrylic Acid on Alumina Powder Surface" Uchida et. al., *Key Engineering Materials*, Vols. 161–163 (1999), p. 133–136]

Nanoparticle materials (that have at least one dimension less than 100 nm) offer unique properties not available with corresponding macro- or micro-fillers. For example, large improvements in barrier, mechanical, or thermal properties have been demonstrated in nylon-clay nanocomposites containing only a few volume percent of the clay nanofiller. With conventional fillers, volume fractions of 30%–40% are required to achieve similar improvements. Improvements in the nylon nanocomposites included a doubling of the tensile modulus and strength for clay loadings as low as 2 vol. % inorganic. In addition the heat distortion temperature of the nylon nanocomposites was increased by up to 100° C. [see for example, U.S. Pat. No. 4,739,007; Kojima et al. "Mechanical properties of nylon 6-clay hybrid", J. Mater. Res., (1993), 8, 1185–1189; Usuki, et al. "Synthesis of nylon 6-clay hybrid", J. Mater. Res., (1993), 8, 1179–1184; Yano et al. "Synthesis and properties of polyimide-clay hybrid", J. Polym. Sci. Part A, (1993), 31, 2493–2498]. Also, particulate fillers have long been known to impart desirable properties to a variety of polymeric materials. For example, mica increases the stiffness of phenol-formaldehyde plastics (A. King "Application of Fillers" in Plasticizers, Stabilizers, and Fillers, P. D. Ritchie ed, Iliffe Books, London, 1972.) Plate-like fillers have been known to improve the barrier properties of their composites (A. A. Gusev and H. R. Lusti, "Rational Design of Nanocomposites for Barrier Applications", Advanced Materials, 2001, Vol. 13(21), 1641–1643). Many other polymers and nano-fillers have been studied in addition to nylon-clay nanocomposites.

As evident from the large amount of research carried out in the field on nanomaterials and nanocomposites over the past decade [see for example: Dagani R., "Putting the "Nano" into Composites", Jun. 7, 1999, C&EN, 25–27; Thayer A. M., Nanotech offers some there, there", Nov. 26, 2001, C&EN, 13–16; and Beall, G. W., "New Conceptual Model for Interpreting Nanocomposite Behaviors" in "Polymer-Clay Nanocomposites", Pinnavaia T. J. and G. W. Beall, Eds., 2001, John Wiley & Sons, Incorporated, Chichester, England, pages 267–279], the methods and principles used for processing traditional macroscopic and microscopic fillers cannot be readily translated into nano-sized materials. Nano-sized filler materials are substantially more challenging to process than common macro- and micro-fillers because their extremely high surface area causes problems of high viscosity when mixed with liquids or polymers and problems of high oil absorption when mixed in resins and oligomers. Foaming or defoaming are other common side-effects of amphiphilic nano-fillers. Agglomeration during drying or processing is another common problem of nano-sized fillers.

In many cases, it is advantageous to provide inorganic particles with an organic surface modification. Modifying the surface of particles that are added to a polymer matrix to form a composite can improve the wetting of the particles by the matrix and improve the dispersion of the particles in the matrix, thereby improving such properties of the composites as strength, toughness, and the ability to act as a barrier. Surface modifications can also improve the adhesion between the particles and the polymer, thereby improving the load transfer and the mechanical properties of the composite. For example, U.S. Pat. No. 4,091,164 teaches the modification of kaolin clays by mixing the clay particles with block copolymers of ethylene oxide and propylene oxide and then melting the polymers so that they adhere to the clay particles. Surface modifications have also provided particulate fillers the ability to bond with a matrix, as is described in e.g. U.S. Pat. No. 3,901,845, which teaches coupling of a mineral filler with a nylon matrix by an aromatic compound having a carboxyl group and a hydroxyl or amine group. PCT application WO 00/09578 and U.S. Pat. No. 6,369,183 B1 also teach surface modification of a filler followed by coupling of the filler to an organic matrix.

Boehmite is a particularly useful material for polymer nanocomposites because agglomerates of nanosized primary particles are readily available at low cost and high purity, and the commercially available agglomerates can be processed into primary particles. The surface of the boehmite can be modified with organic molecules via bonding between carboxylic acid groups and the boehmite surface.

Also, nanoparticles can be made which have a boehmite surface layer and a non-boehmite inner core. For example, alumina nanoparticles can be coated with a boehmite surface layer and then modified with organic acids.

Some of the challenges of working with nano-sized fillers have been addressed in the past. A particularly vexing problem is the tendency of nanoparticles to strongly stick together, forming agglomerates of many primary nanoparticles that can be much larger and therefore less useful than the primary particles. Even worse, even if the agglomerates are broken apart, the particles tend to phase separate and re-agglomerate when they are added to a polymer. For example, U.S. Pat. No. 5,935,275 (Burgard, Nass, Schimdt, 1999) reports methods to prepare weakly agglomerated nano-sized particles, U.S. Pat. No. 6,190,731 (Tecle, Berhan, 2001) reports methods to make isolated ultrafine particles by encapsulating a highly dispersed colloidal suspension with an encapsulant material, and U.S. Pat. No. 6,537,665 (O'Connor, Nehring, Russell, 2003) reports a particulate powder adapted for dispersion in organophilic solvents that comprises a powder particulate material, a first coating on the particulate material that contains a reagent that causes the surface of the particles to be reactive to an organic acid derivative, and a second coating that covers the first coating and contains an amphiphilic surfactant and an organic acid derivative.

More specifically, methods have been reported to prepare organic surface-modified aluminum oxyhydroxide particles of nano-sized dimensions [U.S. Pat. No. 6,369,183, Cook and Barron et al. in Chem. Mater. 1996, 8, 2331–2340, Landry, Barron et al. in J. Mater. Chem. 1995, 5(2), 331–341; Cook, Barron et al. in Chem. Mater. 1997, 9, 2418–2433, Barron et. al. in Chem. Mater. 2000, 12, 795–804, Barron et al. in Macromolecules, 2000, 12,795–804, and Obrey and Barron in Macromolecules, 2002, 35, 1499–1503.]. However, these reported methods produce materials with different (and less useful) properties than the materials prepared according to the present invention. These references have focused on the dispersion of boehmite nanoparticles for the purpose of processing them in aqueous solutions. Typically, these dispersed boehmite nanoparticle solutions are used as precursors in the production of ceramic materials. The organic acids are used primarily to disperse the nanoparticles into water and there is no need to design the nature of the organic modifying groups or use multiple acids to achieve a more specific surface chemistry so that they interact correctly when they are added to a polymer to form a nanocomposite. These references do not teach the production of surface-modified boehmite nanoparticles that have two or more organic acids. Using multiple (two or more) acids, in contrast to a single acid, yields many more possible types of surface chemistries that allow one to tailor the solubility, surface-graft density, and the length of attached organic groups, and to vary combinations of the length of attached organic groups to provide specific nanoparticle-polymer interactions. For example, one organic acid can be used to tailor the surface properties to prevent agglomeration and/or phase separation, while another can be used to attach other useful functionalities to the particle. An additional advantage of using multiple acids for surface modification is the possibility to introduce on the surface complementary functional groups such as a catalytic site and a co-catalyst. Particularly useful applications of nanoparticles functionalized with two acids have been reported in commonly owned U.S. Pat. No. 6,933,046, issued Aug. 23, 2005; U.S. Pat. No. 6,986,943; issued Jan. 17, 2006 and U.S. Pat. No. 6,887,517, issued May 3, 2005.

One useful aspect of the present invention is a method for producing surface modified nanoparticles in which some of the organic modifiers are large molecules, having a molecular weight greater than or equal to 500 Daltons. Others have described the difficulties associated with trying to attach large molecules (defined as larger than 500 Daltons) to nanoparticles [U.S. Pat. No. 5,593,781 Nass, Schmidt and Schmitt]. The present invention teaches a method for partially modifying nanoparticle surfaces with some small molecules at a concentration sufficient to provide for dispersion in appropriate solvents and subsequent addition of large molecules directly to the nanoparticle surface. Similarly it has been difficult to react hydrophilic inorganic particles such as boehmite with hydrophobic molecules that are not water-soluble. The present invention provides a means to modify boehmite particles with hydrophobic carboxylic acids.

Additionally, previous works have not taught the significance of limiting the amount of carboxylic acid used to modify the surface of boehmite so that the acid does not chemically alter the boehmite material. In the present invention the ratio of acid to boehmite is limited to prevent unwanted degradation of the boehmite. The following references and examples 1, 2 and 3 (herein) will illustrate this principle.

U.S. Pat. No. 6,224,846 (Hurlburt, Plummer, 2001) teaches a method of making a dispersible alumina by reacting a slurry of boehmite in water with the salt of an organic sulfonic acid. Sulfonic acid derivatives are highly hydrophilic and therefore are often not desirable in many coating and plastic applications. Therefore, there is an advantage in using hybrid nanoparticles that do not contain sulfonic acids. Hurlburt and Plummer do not teach the reaction of multiple sulfonic acid groups with boehmite. U.S. Pat. No. 6,224,846 also reports a process for preparing metal oxide particles modified with sulfonic acids.

U.S. Pat. No. 4,676,928 (Leach, Decker, 1987) reports a process for producing a water dispersible nano-sized alumina by forming an aqueous alumina slurry from an uncalcined alumina and admixing a monovalent acid to produce an alumina slurry-acid composition having a pH of 5.0 to 9.0, and then aging the composition at a temperature higher than 70° C. The alumina content of the slurry is reported to be 9 to 15% by weight. Monovalent acids disclosed in U.S. Pat. No. 4,676,928 include nitric acid, hydrochloric acid as well as, formic acid, and acetic acid. However, most of the examples show the use of nitric acid (an inorganic acid) with the exception of Example 11 of U.S. Pat. No. 4,676,928, where either acetic acid or formic acid is used. In this example, the alumina slurry was aged at 190° F. for a month to obtaining a water dispersible sol. Leach and Decker only teach the use of a single organic acid, and they teach that it is preferable to use nitric acid, which is not a carboxylic acid.

U.S. Pat. No. 5,593,781 (Nass, Schmidt, Schmitt, 1997) reports a method of manufacturing surface-modified nanometer size ceramic powder by suspending the powder in water or an organic solvent, adding an organic compound which interacts or reacts with groups present on the surface of the ceramic powder, then removing the water or organic solvent. The nanometer-sized ceramic powders of U.S. Pat. No. 5,593,781 include aluminum oxyhydroxides and the modifying organic groups include carboxylic acids. This patent does not teach the use of multiple carboxylic acids and does not teach or recognize the benefits of using multiple carboxylic acids.

U.S. Pat. No. 6,030,599 (Noweck, Schimanski, Meyer, 2000) reports a process for producing water-dispersible alumina hydrates by hydrolyzing and condensing an aluminum alcoholate in water in the presence of a polymerization inhibitor selected from a group of compounds that comprise organic and inorganic acids. Similarly, U.S. Pat. No. 4,211,667 (Yamada, Yoshihara, Ishida, and Sato, 1980) reports a process for producing an alumina sol by neutralizing a water-soluble aluminum salt to produce an alumina gel and then subjecting the gel to hydrothermal treatment in the presence of a single monovalent organic acid. In contrast, the present invention teaches a process that utilizes pre-formed aluminum oxyhydroxide particulate materials. Since aluminum oxyhydroxide powders that are useful for this invention are commercially available in large quantities and at reasonable price, it is advantageous in many situations to start from the pre-formed ceramic powder, rather than have to carry out the hydrolysis and condensation of aluminum alcoholates or aluminum salts as described in U.S. Pat. Nos. 6,030,599 and 4,211,667.

Apblett et al. [Mat. Res. Symp. Proc. Vol. 249 1992] reports the formation of carboxy substituted particles from the reaction of pseudoboehmite and a single carboxylic acid.

Landry et al. [J. Mater. Chem. 1995, 5(2), 331–341] describe the reaction of $[Al(O)(OH)]_n$ with a single carboxylic acid ($HO_2CR$) to form species $[Al(O)_x(OH)_y(O_2CR)_z]_n$ where $R=C_1-C_{13}$ and $2x+y+z=3$. No mixed species, where different R groups were substituted on the alumoxane, were reported.

U.S. Pat. No. 4,983,566 (Wieserman, Karl, Cross, Martin, 1991) reports materials comprising a metal oxide/hydroxide particle that have been reacted with a prefluorinated organic acid, including multiple perflourinated carboxylic acids. Wieserman et al. do not teach the use of organic carboxylic acids having at least one C—H bond.

U.S. Pat. No. 6,369,183 (Cook, Barron, and others, 2002) reports thermoset polymer compositions formed by reacting amine, hydroxyl, acrylic and vinyl substituted carboxylato-modified boehmite with low molecular weight polymer precursors to form a cross-linked network in which the particles are covalently linked to the polymeric matrix. This patent reports methods for preparing these substituted carboxylato-modified boehmite particles (called carboxylato-alumoxanes). However, the materials prepared according to this patent are different (i.e. have different properties) from the materials prepared according to the present invention. In Examples 2–14 of U.S. Pat. No. 6,369,183 carboxylato alumoxane are prepared by mixing boehmite with a carboxylic acid in a ratio of total aluminum atoms of the boehmite to carboxylic acid ranging from 1:4 to 3:2. The use of such high ratios of acid to boehmite attack and in some cases dissolve the boehmite particles, as will be described in more detail herein In contrast, the method of the present invention limit the amount of acid used to avoid, minimize or control the dissolution of boehmite nanoparticles. The dissolution of boehmite can be observed by the disappearance of the typical peaks of boehmite in the XR-D of the product and appearance of new peaks (as shown in Examples 2B and 3B, herein).

Examples 1A, 2A, and 3A and comparative examples 1B, 2C, and 3B, herein show the differences in properties of materials prepared according to this invention and materials prepared according to the methods of U.S. Pat. No. 6,369,183 As evident from the X-RD of the products, partial or complete dissolution of the boehmite particles occurs when high concentration of acids are used according to U.S. Pat. No. 6,369,183. Additionally, in contrast to the materials of this invention, the carboxylato alumoxanes prepared according to U.S. Pat. No. 6,369,183 B1 can be separated in two or more fractions of different chemical compositions that have different solubility properties. Furthermore, when using acids that contain polymerizable double bonds (such as methacrylic acid in Example 14 of U.S. Pat. No. 6,369,183 B1) the product contains polymerized methacrylic acid.

The synthesis of carboxylato alumoxanes from boehmite and carboxylic acids is also reported in Cook, Barron et al. Chem. Mater. 1996, 8, 2331–2340, Landry, Barron et al. J. Mater. Chem. 1995, 5(2), 331–341, Cook, Barron et al. Chem. Mater. 1997, 9, 2418–2433, Barron et. al. Chem. Mater. 2000, 12, 795–804, Barron et al. iMacromolecules, 2000, 12, 795–804], and Obrey and Barron Macromolecules, 2002, 35, 1499–1503. All the materials reported in these papers are prepared by reacting boehmite with 1–40 molar equivalents of an organic carboxylic acid. As detailed above and demonstrated by the comparative examples 1A versus 1B, 2A versus 2B and 3A versus 3B, the properties of the materials obtained with these prior art methods are different from the properties of the materials obtained according to the method of present invention.

Example 48 in U.S. Pat. No. 6,369,183 reports the production of a modified pseudoboehmite particle employing methoxyethoxyacetic acid (MEEA) and sebacic acid. The boehmite is first reacted with MEEA to form a "MEEA-alumoxane" (e.g. a boehmite particle that has been reacted with methoxyethoxyacetic acid) and then the reacted product is stirred for several hours with sebacic acid. The reference teaches making the materials using a level of acid greater than 1:1 (aluminum to acid mole ratio). It does not teach using multiple organic acid beohmite nanoparticles at a loading level (2:1 aluminum to acid or at lower acid levels) that results in the materials described in the present invention. Furthermore the product of Example 48 of U.S. Pat. No. 6,369,183 is an insoluble cross-linked material. The sebacic acid used in that example has two reactive carboxylic acid groups and therefore reacts with more than one particle forming a continuous network of cross-linked particles. In contrast, the methods of this invention produce surface-modified nanoparticles that are not cross-linked with other particles and therefore retain their ability to disperse in water, solvent, polymers, resins and other systems.

There is a need in the art for surface-modified boehmite nanoparticles that are not cross-linked or otherwise aggregated and which exhibit useful rheologic properties including dispersibility in water, water/solvent mixtures, and selected organic solvents as well as in polymers, resins and other materials. Additionally, there is a need in the art for surface-modified boehmite nanoparticles in which the density of organic groups on the surface is selectively controlled to adjust and control the surface properties of the particles.

SUMMARY OF THE INVENTION

The present invention relates to methods for the preparation of surface modified nanoparticles such as aluminum oxyhydroxides, iron oxyhydroxides, scandium oxyhydroxides and mixtures thereof wherein a controlled amount of one or more organic acids are reacted with the particles. The nanoparticle starting materials are pre-formed prior to reaction with the organic acid(s). The present invention further relates to compositions comprising the surface-modified nanoparticles produced in the methods herein. In the methods of the present invention the reaction conditions for surface-modification and the amount of organic acid(s) are controlled such that dissolution of the pre-formed inorganic nanoparticles (the starting material) in the reaction medium, e.g., water, or a solvent mixture containing water is avoided or minimized (i.e., less than about 5% by weight of the starting material is dissolved and preferably less than about 1% by weight of the starting material is dissolved) and a sufficient density of organic groups on the surface of the product is obtained such that the product of the process has surface properties, exhibited, for example, as dispersibility in a selected solvent or solvent mixture, that differ from the properties of the starting material.

Preferably the amount of acid employed for reaction is sufficiently low to avoid a change of crystalline structure of the surface modified particle compared to the starting material, or to avoid a significant change of the average primary particle size of the surface modified product compared to the starting material during the entire process of making the surface-modified nanoparticles (the product).

Generally, in this invention, pre-formed nanoparticles are reacted with one or more organic acids, wherein the organic acid is preferably an organic carboxylic acid. More specifically in this invention, pre-formed inorganic nanoparticles are reacted with controlled amounts of two or more different organic acids having at least one C—H bond, wherein at least one of the acids is an organic carboxylic acid having at least one C—H bond. In an additional specific embodiment, two or more different organic carboxylic acids are reacted with pre-formed inorganic nanoparticles. In another specific embodiment, two or more different organic carboxylic acids are reacted with the pre-formed inorganic nanoparticles wherein at least one of the organic carboxylic acids has molecular weight greater than 500 Daltons. In another specific embodiment, two or more organic carboxylic acids are reacted with the pre-formed inorganic nanoparticles wherein at least one of the organic carboxylic acids contains a reactive functional group or a latent reactive functional group. In another specific embodiment, the starting material is reacted with two or more different organic carboxylic acids neither of which is a dicarboxylic acid (e.g., sebacic acid [1,10-decane dioic acid] is an exemplary dicarboxylic acid).

The amount of organic acid or acids in the reaction are controlled by adjusting the molar ratio of total metals in the nanoparticle to total acid groups in the reaction.(X:1). The range of amounts of acids employed in the reactions herein is such that $(25000/SA) \leq X \leq (500/SA)$. More preferably $(10000/SA) \leq X \leq 750/SA)$ and yet more preferably $(5000/SA) \leq X \leq 1250/SA)$. When the amounts of organic acid or acids are so controlled, most of the organic acid present reacts with the nanoparticle and the surface density of bonded organic acids is substantially the same as the ratio of metal to acid in the reaction mixture.

The invention most generally provides surface-modified nanoparticles produced by the methods herein wherein the density of one or more or two or more organic acids on the surface of the nanoparticle are selectively controlled to provide desired properties. Surface density is controlled by controlling the amounts of the amounts of the one or more organic acids employed in the surface modification reaction. Excess organic acid is not employed. The amount of acid on the surface is adjusted by adjusting the ratio of moles of total metal (aluminum when aluminum oxyhydroxides are surface modified) to moles of acid groups. The maximum amount of organic acid employed is that where the ratio of moles of total metal to moles of acid groups is 2:1. Using less than excess acid avoids undesired dissolution of the nanoparticles. The minimum amount of acid employed is that which results in a measurable change in surface properties of the particles, which is that amount where the ratio of moles of total metal to moles of total acid groups is 100:1. Intermediate amounts of organic acid can be employed to achieve intermediate density of surface coverage of the one or more acid groups.

In a specific embodiment, the surface modification process of this invention involves reacting two or more organic carboxylic acids with boehmite starting materials to produce surface-modified boehmite nanoparticles. With respect to this embodiment, the present invention also relates to a new class of surface-modified aluminum oxyhydroxide nanoparticles, particularly boehmite nanoparticles, prepared by the methods of this invention wherein the surface modification comprises bonding of two or more different organic acids with the particle surface wherein at least one of the organic acids is an organic carboxylic acid. These surface-modified boehmite nanoparticles are compatible with various host systems and have chemical reactivities that can be tailored to make them more useful when used in a mixture with liquids or as fillers in solids.

In a more specific embodiment, the invention provides surface-modified aluminum oxyhydroxide nanoparticles (particularly surface-modified boehmite nanoparticles) wherein the surface modification comprises two or more organic carboxylic acid groups. In an additional specific embodiment, the invention provides surface-modified aluminum oxyhydroxide nanoparticles (particularly surface-modified boehmite nanoparticles) wherein the surface modification comprises two or more organic carboxylic acid groups wherein at least one of the organic carboxylic acid groups has a molecular weight of 500 Daltons or more. In another specific embodiment, the invention provides surface-modified aluminum oxyhydroxide nanoparticles (particularly surface-modified boehmite nanoparticles) wherein the surface modification comprises two or more organic carboxylic acid groups wherein at least one of the organic carboxylic acid groups carries a reactive functional group or a latent reactive functional group. In another specific embodiment, the invention provides surface-modified aluminum oxyhydroxide nanoparticles (particularly surface-modified boehmite nanoparticles) wherein the surface modification comprises two or more organic carboxylic acid groups wherein at least one of the organic carboxylic acid groups carries is an hydrophobic coupound with solubility in water of less than 1% by weight.

Useful properties of the surface-modified nanoparticles of this invention include the ability to modify the rheologic properties or the surface tension of a liquid to which they are added, and the ability of the particles to disperse in organic liquids, polymers, resins and other chemical compounds. Another useful property of these surface modified nanoparticles is to carry specific useful moieties. For example, the surface modified nanoparticles can carry organic corrosion inhibitions on their surface as illustrated in commonly owned U.S. Pat. No. 6,933,046, which is specifically incorporated by reference herein for disclosure of corrosion inhibitors Another useful application is to have functional groups that can further react with other chemical species (i.e. reactive functional groups or latent reactive functional groups), including chemical compounds and polymeric resins. For example, U.S. Pat. No. 6,986,943 and U.S. Pat. No. 6,887,517 disclose reactions of surface-modified nanoparticles with other chemical compounds. These applications are incorporated by reference herein, at least in part, for the disclosure of certain reactive functional groups. Additionally, the surface-modified nanoparticle of this invention can carry reactive functional groups or latent reactive or protected reactive functional groups. These reactive groups can be employed, for example, to add additional organic groups to the particle surface, generating second generation surface-modified particles. The reactive functional groups can react after mixing with a polymeric material to form a, e.g., within a polymeric resin. Reactive groups which facilitate cross-linking with other particles resulting in particle agglomeration are generally to be avoided.

In this invention, the surface density and type (i.e. mixture of two or more) of the organic groups on the surface of the nanoparticle is selectively controlled to achieve the useful properties described above. These useful properties can be tuned (selectively adjusted) by changing the density of the organic groups on the surface of the particles. There is an upper limit to the surface density that can be achieved. Thus, useful surface-modified nanomaterials of this invention typically have a total molar ratio of total aluminum atoms to carboxylic acid ranging from 100:1 to 2:1 when their BET (Brunauer Emmett and Teller) surface area is at least 100 $m^2/g$ and more preferably is at least 200 $m^2/g$. In a preferred embodiment of this invention the molar ratio of total aluminum atoms to carboxylic acid is in the range of 20:1 to 3:1. In all cases, the concentration of the carboxylic acids used cannot exceed the limit where the boehmite begins to dissolve or begins to be converted to other materials (i.e. salts, etc.).

In a specific embodiment, surface-modified boehmite or pseudoboehmite nanoparticles carrying high molecular weight or hydrophobic organic groups are made by reacting two or more organic carboxylic acids with pre-formed boehmite or pseudoboehmite nanoparticles in a mixed solvent system, wherein at least one of the organic acids is a high molecular weight (500 Daltons or more) organic acid or a hydrophobic acid which is not soluble in water. In this reaction, a first generation surface-modified nanoparticle is first prepared by reaction with a first organic acid to generate a surface-modified nanoparticle that is dispersible in a water-organic solvent mixture in which the high molecular weight or hydrophobic carboxylic acid is soluble. In preferred embodiments, the first generation surface-modified particle is generated by reaction of the starting nanoparticle with a low molecular weight carboxylic acid or a carboxylic acid carrying hydrophilic groups (e.g., OH groups).

BRIEF DESCRIPTION OF THE DRAWINGS

In FIG. 2A, the first generation particle results from reaction of a carboxylic acid carrying a non-reactive group and a carboxylic acid carrying a reactive functional group (e.g., acrylic acid). A second generation particle is formed by reaction of the reactive group of the reactive organic carboxylic acid of the first generation to add an additional organic group which reacts with the reactive group of the organic acid (illustrated as a high molecular weight species) to the surface. In FIG. 2B, the first generation particle is generated by reaction of a carboxylic acid carrying a non-reactive group, a carboxylic acid carrying a reactive functional group (unprotected reactive group) and an exemplary carboxylic acid carrying a latent reactive group (i.e., a reactive group that is protected and which can be activated as desired to be reactive). A second generation surface-modified particle can be generated by reaction of the first generation particle with an organic molecule which reacts with the unprotected reactive group. A different (more complex) second generation surface-modified particle can then be generated by initial deprotection of the protected reactive groups of the second generation particle and subsequent reaction of the deprotected reactive group with another organic molecule which reacts with the deprotected reactive group. The order of the second and third reactions illustrated in FIG. 2B can be reversed.

DETAILED DESCRIPTION OF THE INVENTION

Figure 1:
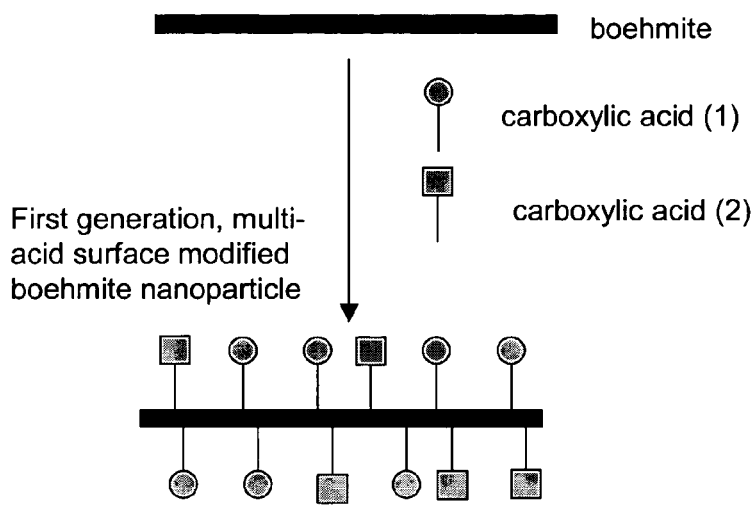
FIG. 1. Illustration of a first generation, multi acid surface modified boehmite nanoparticle.
Figure 2A:
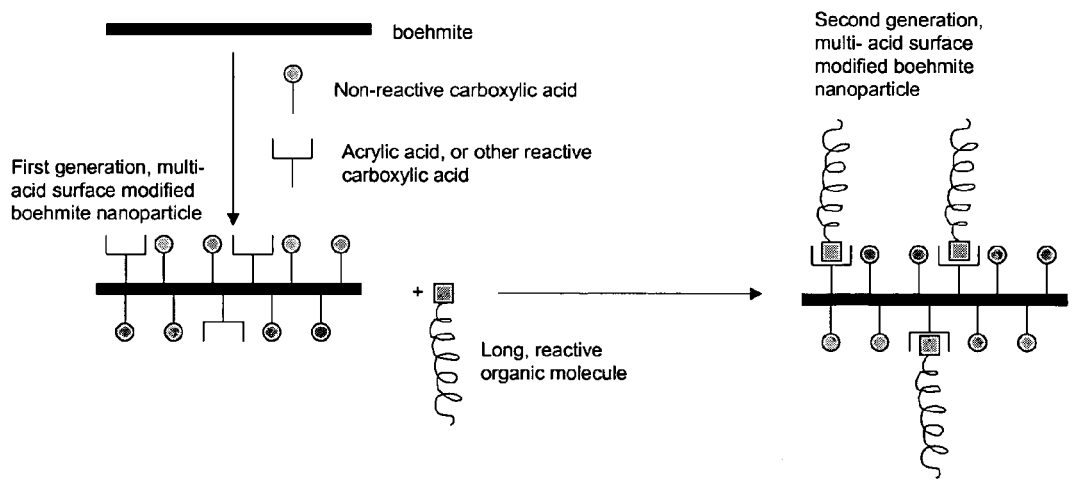
FIGS. 2A and 2B. Illustrations of first generation, multi acid surface modified boehmite nanoparticle, in which one acid is reactive (or latent reactive, e.g., a protected reactive) and one is non-reactive.
Figure 2B:
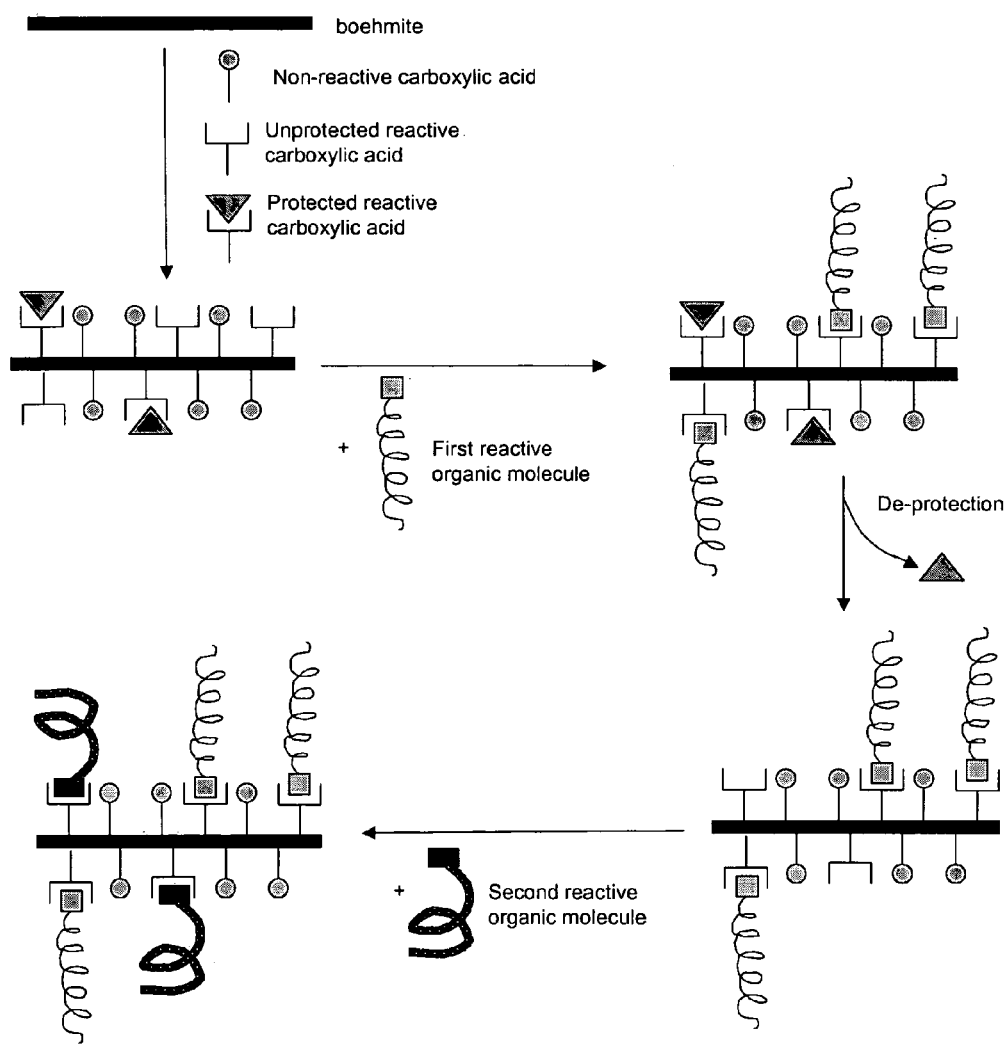

This invention relates to methods for preparation of surface-modified nanoparticles and surface-modified nanoparticles prepared by such methods. The starting materials for the methods of this invention are finely divided materials wherein the particles have at least one dimension that is 100 nm or less. The particles have a surface shell comprising at least 5% by weight of aluminum oxyhydroxide, iron oxyhydroxide, scandium oxyhydroxide, a solid solution of aluminum oxyhydroxide and iron oxyhydroxide, or mixtures thereof. The core of the particles may be identical to or different from the surface shell, and the core may be either organic or inorganic material. The core may also be gelatinous or swollen polymer which would subsequently retract upon solvent removal to create essentially a hollow particle. Where the compositions of the core and shell differ, the particles are referred to as having a core-shell structure. In general the nanoparticles used as starting materials in this invention have surface area greater than or equal to 20 $m^2/g$. Nanoparticles used as starting material herein can have surface area greater than or equal to about 50 $m^2/g$. Preferably nanoparticles used as starting material herein have surface area greater than or equal to 100 $m^2/g$. More preferably nanoparticles herein have surface area greater than or equal to 200 m$^2$/g. A preferred class of nanoparticles useful herein exhibits surface area between about 150 m$^2$/g to 250 m$^2$/g. In all cases herein surface area refers to BET (Brunauer Emmett and Teller) surface area, which is determined by methods well-known in the art. A preferred class of particles is aluminum oxyhydroxides. Preferred aluminum oxyhydroxides are boehmite and pseudoboehmite.

Aluminum oxyhydroxide is to be broadly construed to include any material whose surface is or can be processed to form a shell or layer of aluminum oxyhydroxide (e.g., boehmite) including specifically aluminum metal, aluminum nitride, aluminum oxynitride (AlON), $\alpha$-Al$_2$O$_3$, $\gamma$-Al$_2$O$_3$, transitional aluminas of general formula Al$_2$O$_3$, boehmite ($\gamma$-AlO(OH)), pseudoboehmite ($\gamma$-AlO(OH).xH$_2$O where 0<x<1), diaspore ($\alpha$-AlO(OH)), and the aluminum hydroxides (Al(OH)$_3$) of bayerite and gibbsite. Thus, aluminum oxyhydroxide nanoparticles particles in this invention are any finely divided materials with particles having at least one dimension that is less than 100 nm and a surface shell comprising at least 5% by weight of aluminum oxyhydroxide. Boehmite and pseudoboehmite are aluminum oxyhydroxides of the general formula gamma-AlO(OH).zH$_2$. When x is 0, the materials is called boehmite; x>0 and the materials incorporate water into their crystalline structure they are known as pseudoboehmite. Boehmite and pseudoboehmite are also described as Al$_2$O$_3$. zH$_2$O where, when z is 1, the material is boehmite and when 1<z<2 the material is pseudoboehmite. Boehmite and pseudoboehmite are differentiated from the aluminum hydroxides and diaspore by their compositions and crystal structures. Boehmite is usually well crystallized with a structure in accordance with the x-ray diffraction pattern given in the JCPDS-ICDD powder diffraction file 21–1307, whereas pseudoboehmite is less well crystallized and generally presents an XRD pattern with broadened peaks with lower intensities. For the purposes of this specification, the term 'boehmite' implies boehmite and/or pseudoboehmite. Thus, boehmite particles in this invention are any finely divided materials wherein the particles have at least one dimension less than 100 nm and a surface shell comprising at least 5% of boehmite and/or pseudoboehmite.

More specifically, the boehmite nanoparticles of this invention are finely divided particles having one dimension less than 100 nm and a surface area greater than or equal to 20 m$^2$/g, and having a surface shell comprising at least 5% of boehmite and/or pseuoboehmite The core of the particles may be identical to or different from the surface shell, and it may be either an organic or inorganic material. Where the composition of the core differs from the composition of the shell, the particles are referred to as having a core-shell structure. The preferred particles of this invention are entirely boehmite.

First generation surface-modified nanoparticles are surface-modified nanoparticles in which the organic compounds on the surface have been attached via direct reactions between an organic acid group and the nanoparticle surface. Multi-acid first generation surface modified nanoparticles contain two or more organic acids attached to the nanoparticle surface. Preferably at least one of the two or more organic acids are organic carboxylic acids. More preferably two or more of the organic acids are organic carboxylic acids. Organic acids may contain reactive groups which may be latent or protected reactive groups. Organic acids may contain polar groups or hydrophilic groups (e.g., OH groups) which increase the solubility of the acid and the solubility or dispersibility of the surface-modified nanoparticles in hydrophilic or polar media.

Second generation surface-modified nanoparticles are surface-modified nanoparticles in which additional organic compounds are reacted with and thereby attached to organic molecules that were previously attached to the particle surface (i.e. to a first generation surface-modified nanoparticle). The additional organic compounds contain functional groups that react with the reactive groups that are already present on the first generation surface-modified nanoparticles. If the first generation surface-modified nanoparticles contain latent reactive groups or protected reactive groups, an intermediate step of activation or deprotection of those groups is needed to generate second generation nanoparticles.

Various methods for making first and second generation surface modified particles are illustrated in FIGS. 1, 2A, 2B, 3 and 4. These illustrated methods are not limiting and the order of steps illustrated in the figures may be changed. Any combination of organic acids having reactive, protected, latent reactive or non-reactive groups may be employed in surface modification methods herein.

Organic acids are any organic molecule that contains one or more acid groups and which have at least one C—H bond. Acid groups include carboxylic acid groups (RCOOH or as ionized RCOO$^-$, where R is any organic radical having at least on C—H bond), phosphinic acid groups (RR'P(O)OH or as ionized RR'P(O)O$^-$ where R or R' is any organic radical having at least one C—H bond), phosphonic acid groups (R—P(O)(OH)$_2$ or as ionized RR'P(O)(OH)O$^-$ or RR'P(O)O$_2^{2-}$, where R is any organic radical having at least one C—H bond), sulfonic acid groups (R—S(O)$_2$OH or as ionized R—S(O)$_2$O$^-$), sulfinic acids (RS(O)OH or as ionized RSOO$^-$), sulfenic acids (RSOH), borinic acids (RR'B (OH)), boronic acids (RB(OH)$_2$), where R is any organic radical having at least one C—H bond. The use of two or more organic sulfonic acids or a combination of one or more carboxylic acids and one or more sulfonic acids are not preferred in the present invention.

Organic carboxylic acids are any organic molecule that contains one or more carboxylic acid groups and which have at least one carbon-hydrogen bond. Preferred carboxylic acids of this invention contain only one carboxylic acid group per molecule to avoid cross-linking of the particles. Preferred carboxylic acids contain more than one C—H bond. However, certain molecules that contain more than one carboxylic acid group, but do not tend to cross-link because of conformation or steric reasons may be used even if cross-linking is undesired. For example, phthalic acid and isophthalic acid are among the preferred organic carboxylic acids of this invention, while terephthalic acid and sebacic acid (an exemplary dicarboxylic acid) are less preferred because they will function for cross-linking. Reactive carboxylic acid derivatives such as such as acyl halides (e.g., acyl chlorides), acid anhydrides (e.g., acetic anhydride and other acid anhydrides) and activated esters (e.g., p-nitrophenyl esters, pentafluorophenyl esters, etc.) can also be reacted with nanoparticles to provide surface-modification of nanoparticles with carboxylic acids.

Perfluorinated carboxylic acids (e.g., perfluoroacetic acid) comprise any molecule that contains one or more carboxylic acid groups and contain no carbon-hydrogen bonds. For purposes of this specification, perfluorinated carboxylic acids are not organic carboxylic acids. However, fluorinated carboxylic acids, such as trifluoropropanoic acid are organic carboxylic acids. This invention encompasses, methods in which one of the two or more carboxylic acids employed for surface modification is a perfluorinated (or other perhalogenated) carboxylic acid.

In preferred embodiments, this invention encompassed surface modification in which one or more organic carboxylic acids are reacted with nanoparticles, particularly boehmite nanoparticles. In specific embodiments, the nanoparticles herein can be reacted with one or more organic acids that are not carboxylic acids (e.g., phosphinic and/or phosphonic acids) and one or more organic carboxylic acids. In specific embodiments, the nanoparticles herein can be reacted with an organic acid that is not a carboxylic acid (e.g., a phosphinic or phosphonic acid) and one or more organic carboxylic acids Organic acids or organic carboxylic acids may contain reactive groups which may be latent or protected reactive groups. Organic acids or organic carboxylic acids may contain polar groups or hydrophilic groups (e.g., OH groups) which increase the solubility of the acid and the solubility or dispersibility of the surface-modified nanoparticles in hydrophilic or polar media.

High molecular weight organic acids or organic carboxylic acids are acids that have a molecular weight greater than or equal to 500 Daltons Organic acids and organic carboxylic acids may also be the products of oligomerization or polymerization reactions of one or more low molecular weight species. These materials are characterized by their "weight average molecular weight," also called "weight average molar mass" that is defined as:

$$<M>_w = (\Sigma w_i M_i)/(\Sigma w_i),$$

where < > indicates that it is an average, $$w_i = N_i M_i / N_A,$$

$N_i$ is the number of molecules of the polymer i having molar mass $M_i$. [J. M. G. Cowie, "Polymers: Chemistry & Physics of Modern Materials", $2^{nd}$ Edition, Blackie Academic & Professional, Great Britain, (1993), pages 8–9]. The weight average molecular weight is typically measured by Gel permeation Chromatography (also called size exclusion chromatography) using either a light scattering or a refractive index detector, using appropriate standards of known mass [J. M. G. Cowie, "Polymers: Chemistry & Physics of Modern Materials", $2^{nd}$ Edition, Blackie Academic & Professional, Great Britain, (1993), pages 210–214]. High molecular weight oligomeric or polymer organic acids or organic carboxylic acids are carboxylic acids that have weight average molecular weight equal to or greater than 500 Dalton.

In specific embodiments, one or more organic acids or organic carboxylic acids employed in the methods herein can be high molecular weight acids having molecular weight or weight average molecular weight equal to or greater than 500 Daltons. In a particular subset of methods of this invention one or more of the organic acids or organic carboxylic acids employed in the methods herein can be higher molecular weight acids having molecular weight or weight average molecular weight equal to or greater than 750 Daltons. In a particular subset of methods of this invention one or more of the organic acids or organic carboxylic acids employed in the methods herein can be very high molecular weight acids having molecular weight or weight average molecular weight equal to or greater than 1,000 Daltons.

Non-reactive organic acids or organic carboxylic acids are organic acids or organic carboxylic acids with one appropriate acid group and no other functional groups that are reactive under the reaction conditions used to generate a first or second generation surface-modified nanoparticle and which are generally non-reactive in any application in which the surface-modified particles are intended to be used. Examples of non-reactive functional groups are non-reactive halogens, i.e, fluorine, perhalogenated groups (e.g., trifluoromethyl groups), hydroxyl groups (—OH), nitriles (—CN), and nitro groups (—$NO_2$). Organic acids of this invention may contain one or more than one non-reactive group. It is noted that the classification of a group as a non-reactive group or a reactive group depends upon the environmental conditions to which the group will be exposed. Furthermore, groups that are generally non-reactive may over long periods of time or on exposure to extreme conditions react. For example, hydroxyl groups may be reactive under certain conditions. Preferred non reactive groups are simply unsubstituted alkyl groups or unsubstituted aromatic rings (e.g. phenyl groups).

Reactive organic acids or organic carboxylic acids are organic acids and organic carboxylic acids with at least one appropriate acid group and at least one other reactive functional group. Reactive functional groups include among others amine or amino groups, additional acid groups (e.g., carboxylic acid or other acid groups), reactive carbon—carbon double bonds (e.g., acrylate and methacrylate), reactive carbon—carbon triple bonds, thiols, isocyanates, thioisocyanates, alkyl iodide, alkyl bromide. Organic acids of this invention may contain one or more than one reactive group. Reactive groups also include groups which can be selectively activated for reaction which are designated latent reactive groups, which must be activated for reaction and protected reactive groups which must be deprotected for reaction.

A number of protecting groups are known and used in the art of organic synthesis to protect a given functional groups from reaction under certain conditions. In general protective groups are selected for ease and high yield of the reaction forming the protecting group, for stability of the protecting group under the conditions of its application and for the ease and high yield of the deprotection reaction which regenerated the reactive group. For example, the formation of certain esters can function for protection of carboxylic acids, amine groups can be protected by the formation of N-acyl amide or N-sulfonamides, carbonyl groups can be protected by the formation of lactones, acetals and thioacetals and reactive alcohols can be protected by the formation of ethers or by reaction with organic silanes. Methods and reagents for protecting and deprotecting various reactive functional groups are well-known in the art.

Organic acids of this invention include carboxylic acids (RCOOH), phosphinic acid (RR'P(O)OH), phosphonic acid groups (R—P(O)(OH)$_2$) sulfonic acids, sulfinic acids (RS(O)OH), sulfenic acids (RSOH), borinic acids (RR'B(OH)), and boronic acids (RB(OH)$_2$), and their ionized forms where R and R' is any organic radical.

R and R' groups of organic and organic carboxylic acid groups can, for example, be straight-chain or branched alkyl groups or aromatic groups, such as a phenyl group or a naphthyl group. Alkyl groups include small alkyl groups having one to six carbon atoms, intermediate alkyl groups having 7–25 carbon atoms and long alkyl groups having 26 or more carbon atoms. As noted above, R an R' groups can be substituted with one or more reactive groups or one or more non-reactive groups (noting that alkyl groups are generally considered non-reactive groups themselves). R and R' groups may be substituted with one or more alkoxide groups (—OR"), one or more aromatic groups (including among others phenyl groups, benzyl groups, naphthyl groups), one or more hydroxyl groups, one or more amine groups, one or more halogens, one or more nitrile groups, one or more nitro groups. R and R' that are aromatic groups can be substituted with alkyl groups. R and R' groups may also be cyclic alkyl groups (including among others monocyclic and bicyclic groups) and substituted cyclic alkyl groups (i.e., substituted with halogens, hydroxyl groups, alkoxide groups (OR"), nitro groups, nitrile groups etc.). One or more —$CH_2$— moieties in the R and R' groups may be replaced with an oxygen, a sulfur, a carbonyl group, a —O—CO— group, a —N—CO— group and the R and R' groups may contain one or more double or triple bonds (alkenyl groups or alkynyl groups). R" can be all variables listed above for R and R' groups that are compatible with bonding to oxygen. This listing of R, R' and R" groups is illustrative and not intended to be limiting.

In a preferred embodiment the particle core of the nanoparticles of this invention comprises metals (particularly aluminum alloys and iron alloys), inorganic oxides, inorganic oxyhydroxides, inorganic hydrates, inorganic salts, minerals, inorganic pigments, and glasses and the shell consists of aluminum oxyhydroxide. In another preferred embodiment, the core and shell of the materials are a solid solution of iron and aluminum oxyhydroxides. In a more preferred embodiment the core is aluminum, aluminum oxide, aluminum nitride, and other aluminum-containing minerals or salts and the shell is aluminum oxyhydroxide. In the currently most preferred embodiment the core and shell of the particles are both of the same material comprising boehmite [$AlOOH \cdot x(H_2O)$] with a BET surface area of over 180 $m^2/g$.

In one preferred aspect, the surface modifications of this invention comprise reacting two or more organic or organic carboxylic acids with boehmite or other aluminum oxyhydroxide on the surface of a nanoparticle. For example, first generation surface modified boehmite nanoparticles are produced by using two carboxylic acids, such as acrylic acid and propionic acid (as illustrated in FIG. 1). To make a "first generation" surface-modified nanoparticles, the appropriate amount of pseudo-boehmite nanoparticles (for example Catapal A, Sasol North America) are dispersed in a small amount of water (~250 g water per 100 g Catapal A) and heated to 80° C. After about 2–3 hours, an acid solution is made, containing the appropriate amounts of acrylic and propionic acids. The acids are added to water, to form an approximately 10–20% solution (by weight). The acid solution is then dripped into the Boehmite/water dispersion over about 30 minutes. After the acid addition is complete, water is added to bring the solution to a 10% by weight solution of the acid surface-modified boehmite nanoparticles in water. This is then allowed to react for about 20 hours. At this point, the solution is cooled and spray dried to reveal a free-flowing white powder, with a slightly acidic odor. This powder consists of multi-acid (i.e., two-acid) surface modified nanoparticles After production, the dried first generation (acrylic acid-containing) surface-modified boehmite nanoparticles can be titrated by oxidation/reduction to determine the double bond concentration present on the surface of the nanoparticle. The dried surface modified boehmite nanoparticles containing less than 10 mg of acrylic acid are placed in a 20 mL sample vial. To this vial, 2 mL of 1:1 acetic acid is added and thoroughly shaken. Next 5 mL of 1:1 sulfuric acid is added, along with 1 mL of 20% periodic acid. The sulfuric acid is used as a source of protons for the oxidation-reduction reaction, while the periodic acid is a stabilizing agent. The vial is shaken and then placed in an ice bath to keep the acrylic acid from evaporated due to heat generated from the reaction. While in the ice bath, the solution is titrated with 0.02N potassium permanganate to a pink or red endpoint. After the titration is complete, the concentration of double bonds can be determined using the following equation:

$$X = \text{mL of } KMnO_4 \times \text{Normality of } KMnO_4 \times C/\text{grams of sample}$$

Where X is the mass fraction of acrylic acid (bound to the particle surface) relative to the total mass of the surface modified boehmite nanoparticle.

Once the constant C is determined (20.0 mg of acrylic acid per milliequivalent of potassium permanganate) the first generation surface modified boehmite nanoparticles can be titrated to determine the amount of acrylate double bonds present. Once these numbers are obtained, a double bond equivalent weight (DBEW), can be readily determined using the following equation:

$$\text{double bond equivalent weight} = MW \text{ acrylic acid}/X$$

The units of the result are grams of surface modified nanoparticles per mole of acrylic double bond. This equivalent weight allows us to calculate the molar amounts of the materials to be added to form our "second" generation surface modified boehmite nanoparticles (e.g. FIG. 2A).

For some specific applications the need to have both reactive and non-reactive groups (i.e. acrylic acid and propionic acid) on the nanoparticle is based on the need to independently control the surface density of organic groups while maintaining a desired level of functional groups. For example, propionic acid helps to disperse the particles in water, modifies their solubility making the particles more hydrophobic in nature, and is non-reactive, while the acrylic acid helps to disperse the particle and has a reactive carbon—carbon double bond. This bond can react with amines and provides a point of attachment so that we can make additional organic modifications to the particle surface [See examples in U.S. patent application Ser. No. 10/171,422 and Ser. No. 10/171,402], or it can be left to polymerize with monomers (such as acrylates, methacrylates, urethane acrylates, etc.) or with other reactive group that are part of oligomers, prepolymers or polymers to form a nano-composite.

Figure 3:
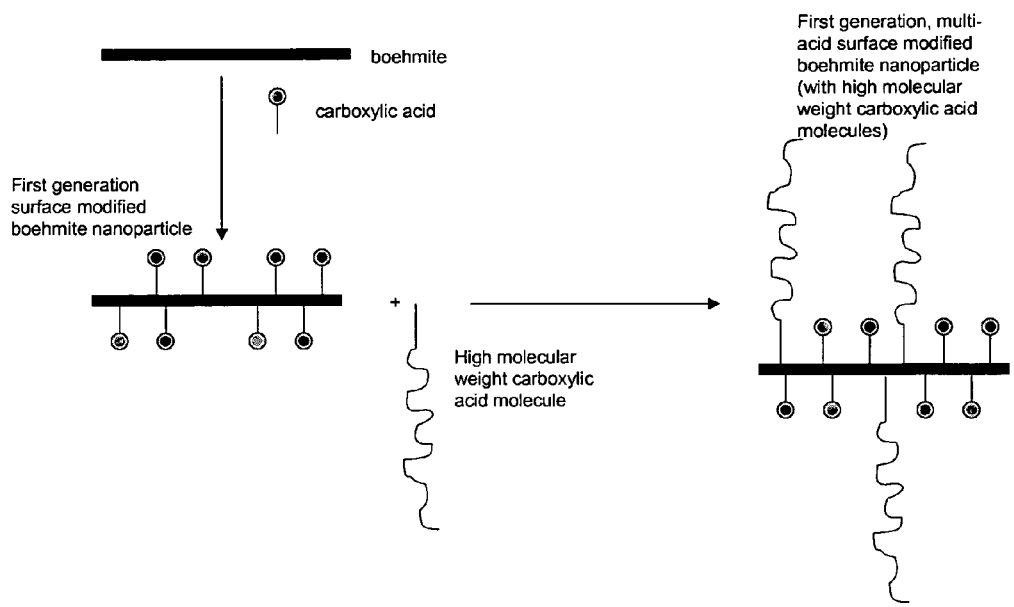
FIG. 3. Illustration of a first generation, multi acid surface modified boehmite nanoparticle in which the first acid is a low molecular weight organic carboxylic acid and the second acid is a high molecular weight organic carboxylic acid.
Figure 4:
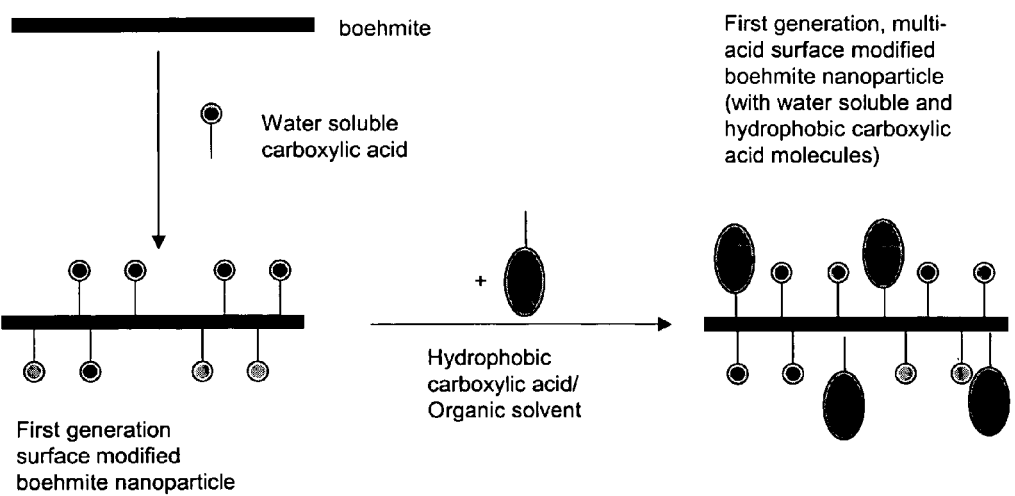
FIG. 4. Illustration of a first generation, multi acid surface modified boehmite nanoparticle in which the first acid is a water-soluble organic carboxylic acid (e.g., a hydroxyl acid, such as lactic acid) and the second acid used is a hydrophobic non-water soluble organic carboxylic acid.

Another example of the benefits of using two or more carboxylic acids is that they allow us to prepare surface-modified boehmite nanoparticles in which one or more high-molecular weight carboxylic acids (MW≧500 Daltons) are directly bonded to boehmite nanoparticles or previously prepared surface-modified boehmite nanoparticles (FIG. 3). High-molecular weight carboxylic acids are organic carboxylic acids with molecular weights equal to or greater than 500 Daltons, if they are defined molecular species, or with weight average molecular weight equal to or greater than 500 Dalton, if they are oligomeric or polymeric species with a molecular weight distribution. Additionally, this invention also describes a method for preparing surface modified boehmite nanoparticles made from hydrophobic organic carboxylic acids (FIG. 4). Hydrophobic organic carboxylic acids are organic carboxylic acids with solubility in water of less than 1% by weight at 100C.

In a preferred embodiment of this invention two or more organic acids are added in sequential reactions. Usually a low molecular weight, water soluble organic acid is added first to produce first generation surface-modified nanoparticles that can be dispersed in organic solvents or in water/organic solvent mixtures. These first generation particles serve as the starting material for the reaction with the high molecular weight or hydrophobic acid. The first organic acid is usually a low molecular weight carboxylic acid that is sufficiently water-soluble in either cold or hot water to react with boehmite at a reasonable rate (in less then 24 hr). Preferred first organic carboxylic acids are propionic acid, lactic acid, methoxyacetic acid, methoxypropionic acid, methoxyethoxy acetic acid, methoxyethoxyethoxyacetic acid (MEEA), benzoic acid, hexanoic acid, and similar compounds. The loading of this first organic carboxylic acids must be sufficiently low to leave enough unreacted surface for subsequent reactions to take place. For the first acid typical ratios of aluminum (from boehmite) to acid of 20:1 to 5:1 are used for particles which have a surface area of about 200 m$^2$/g. The advantage of using these first generation surface-modified boehmite nanoparticles rather then boehmite nanoparticles as the starting material is that they are substantially more soluble in water and/or organic solvents than boehmite nanoparticles. This makes the reaction with the high molecular weigh and/or hydrophobic acid faster and homogeneous products are obtained. Direct reaction of the high molecular weight acid with boehmite particles would be extremely slow because the low amount of carboxylic acid groups is not sufficient to disperse the boehmite particles in water. Furthermore high molecular weight carboxylic acids have often poor solubility in water. This method is also useful to prepare particles modified with hydrophobic acids.

In a preferred embodiment, the starting material is propionic acid-modified boehmite nanoparticles with a low loading of propionic acid based on the mole ratio of aluminum to acid of from 20:1 to 8:1 and a carboxylic acid functionalized polyester with a molecular weight of 500–50,000. The carboxylic acid functionalized polyester is dissolved in an opportune solvent (for example ethyl acetate or butyl acetate), and the propionic acid modified boehmite nanoparticles are dispersed in water. The two solutions are mixed together. A third solvent (for example ethanol) may be added to make the mixture homogenous. The mixture is then refluxed for 1 to 72 hrs. At the end of the reaction the crude mixture is a homogeneous emulsion. After drying, the product is a homogenous powder or viscous gel.

In another preferred embodiment, benzoic acid-surface modified boehmite nanoparticles are prepared in a water/solvent mixture in which the product is soluble. The water is then removed by fractional distillation and this material is further reacted with a mono-carboxylic acid polyethylene or polystyrene oligomer with molecular weight of 500–1,000,000.

In another preferred embodiment, methoxypropionic acid surface-modified boehmite nanoparticles are reacted first with a mono-carboxylic acid polyester oligomer in a mixed water/solvent system, and then, after removal of the water, the product is reacted with a high molecular weight monocarboxylic acid polyethylene. Two high molecular weight acids may be added in a single step or in the sequential steps.

In another preferred embodiment, the starting materials (themselves a subject of the present invention) are surface-modified boehmite nanoparticles prepared from a mixture of two low-molecular weight acids (for example propionic acid plus acrylic acid, or propionic acid and hexanoic acid), in which the two acids are added simultaneously or sequentially to boehmite. This two-acid starting material is then reacted with one or more high molecular weight acids according to the methods described in the present invention.

In this invention, the properties of the materials produced (and therefore their usefulness) depends strongly on the surface density of the organic functional groups on the surface of the nanoparticle. The properties can be tuned by changing the density of the organic groups of the surface of the particles, and useful properties cannot be obtained outside certain limits of group surface density. Thus, useful surface modified boehmite nanoparticles of this invention typically have a molar ratio of total aluminum atoms to organic carboxylic acid ranging from 100:1 to 2:1. In a preferred embodiment of this invention, the molar ratio of total aluminum atoms to organic carboxylic acid is in the range of 40:1 to 3:1. In the most preferred embodiment of this invention, the molar ratio of total aluminum atoms to organic carboxylic acid is in the range of 20:1 to 5:1. The relative concentration of carboxylic acid to aluminum is limited on the upper end (2 aluminum to 1 acid) to prevent unwanted decomposition of the boehmite nanoparticle. Therefore, the materials of this invention can further be described as having the crystalline structure and chemical nature of the core particle preserved intact in the product. And on the lower end there must be enough organic carboxylic acid to promote dispersion of the particles in liquids, monomers, oligomers and resins. The lower limit is 100:1, 40:1 for the preferred embodiment, and 20:1 for the most preferred embodiment.

The optimum ratio of aluminum to acid strongly depends upon the particle surface area and the carboxylic acid molecular weight and structure. In most cases, preferred ratios of total aluminum atoms to total carboxylic acid groups are between 100:1 and 2:1. When using particles with surface area of 180 m$^2$/g or higher and a low molecular weight carboxylic acid (MW<500) the most preferred range of total aluminum atom to total carboxylic acid group is 20:1 to 3:1. When using particles with surface area of 180 m$^2$/g or higher and a high molecular weight carboxylic acids (MW$\geq$500) the most preferred range of total aluminum atom to total carboxylic acid group ranges is 100:1 to 20:1

The reaction between the organic carboxylic acid and the boehmite nanoparticles is carried out in a medium in which the acid is at least partially soluble (solubility >5% at the boiling temperature of the medium) and the aluminum oxyhydroxide particles are homogenously dispersed. Dispersion of the particles may require the presence of the carboxylic acid itself, an additional strong acid (such as nitric acid, hydrochloric acid, or a stronger carboxylic acid), heating, stirring, or a combination of factors thereof. The medium comprises water, electrolyte solutions, acidic solutions, organic solvents, and mixture thereof. When the reagent is a water-soluble carboxylic acid, an especially useful medium is water or acidic water. When using an acid that is poorly soluble in water, a mixture of water and a water-miscible solvent is preferred. Preferred water-miscible solvents include methanol, ethanol, 1-propanol, 2-propanol, 1-methoxy-2-propanol, 2-propoxyethanol, other alkoxyalcohols, ethylene glycol, propylene glycol, other glycols, polyglycols and alkoxyglycols, acetone, acetol, and other water-miscible ketones, water-miscible esters, water miscible acetates, tetrahydrofuran and other-water miscible ethers, acetonitrile and other water-miscible-solvents. Partially water miscible solvents such as 1-butanol and water immiscible solvents could also be used under proper conditions.

Using two or more different organic acids, as opposed to a single acid, yields many more possible types of surface chemistries that allow one to tailor the solubility, surface graft density, length of attached organic groups, varying combinations of the length of attached organic groups, for specific nanoparticle to polymer or liquid interactions. Other surface modifications may be used to prevent agglomeration and facilitate dispersion.

Using two or more carboxylic acids in the surface treatment of boehmite can lead to surprising and useful dispersion and/or nanocomposite properties. Furthermore, in many cases, to produce a successful nanocomposites the surface chemistry of boehmite particles must be tailored to balance such factors as graft density, total organic content, steric stabilization, hydrogen bonding, compatibility and the like, and an appropriate composition is usually impossible to obtain with a single surface modifying molecule (carboxylic acid). The design of the surface chemistry can additionally be complicated by the fact that the types of surface treatments that generally lead to easy dispersion often do not correspond to the types of treatments that lead to improved mechanical, barrier or chemical properties in the nanocomposite.

First generation surface modified boehmite nanoparticles have been made from combinations of acrylic acid and propionic acid, lactic acid and propionic acid, methoxyethoxyethoxy acetic acid and propionic acid. Second generation alumoxanes have been produced from first generation alumoxanes that contain carboxylic acids with a reactive functional group, such as an acrylate or an amine, followed by subsequent reactions to attach additional organic molecules to the pendant groups of the first generation.

In a preferred embodiment, the materials of this invention have two or more carboxylic acids used to form a first generation surface modified boehmite nanoparticle and the total moles of aluminum atoms to moles of acid groups ratio is higher than 2 to 1 (moles aluminum to moles carboxylic acid) and the nanoparticle comprises a surface that is at least 5% boehmite, pseudoboehmite, or aluminum oxyhydroxide.

In the most preferred embodiment, the materials of this invention have two or more carboxylic acids used to form a first generation surface modified boehmite nanoparticle and the total aluminum to acid ratio is higher than 2 to 1 (moles of aluminum atoms to moles of carboxylic acid groups) and the inorganic core is composed entirely of boehmite, pseudoboehmite, or aluminum oxyhydroxide.

A specific embodiment of this invention is first generation surface-modified boehmite nanoparticles made using both low and high molecular weight carboxylic acid molecules. Low molecular weight carboxylic acids are acids such as propionic acid and acrylic acid that have molecular weight less than 500 Daltons (and preferably less than about 200 Daltons, and more preferably carboxylic acids having less than about 6 carbon atoms) and high molecular weight carboxylic acids have a molecular weight greater than or equal to 500 Daltons (and preferably carboxylic acids having 30 or more carbon atoms). It is generally difficult to react high molecular weight carboxylic acids to the surface of boehmite. Reaction times can be excessively long (days, to weeks) or the boehmite nanoparticles can not be dispersed into a medium with the long carboxylic acids (U.S. Pat. No. 5,593,781). The present invention teaches the use of low molecular weight carboxylic acids to initially form a first generation surface modified boehmite nanoparticle that has modified solubility and can be dispersed into a solvent or combination of solvents that is compatible with high molecular weight carboxylic acids. The rate of reaction can be drastically improved and the ability to bond long carboxylic acids to boehmite is made possible by the present invention.

The present invention relates to surface modification of nanoparticles. Reaction conditions can be selected generally as is understood in the art, in view of the examples provided herein to achieve the desired surface-modified products. Reaction conditions including temperature, solvent or solvent mixtures, pressure will depend upon the specific starting materials and the organic acids or types of organic acids employed in the surface modification. As noted herein the amount of organic acids employed in the surface modification is controlled to avoid undesired dissolution or change in structure of the nanoparticles and to obtain sufficient surface modification. The amount of acid employed depends upon the surface area of the nanoparticle to be modified as described herein. Other reactions conditions are selected within a range that is appropriate for the amount of organic acid or acids that are to be employed in the reactions. The medium (solvent or solvent mixture) of the reaction is typically chosen in view of the starting materials and acids such that a homogenous system results where the particles are sufficiently dispersed in the medium to react with similar kinetics. The concentrations of the reagents in the various reactions are preferably controlled at a level that the reaction mixture can be homogenously mixed throughout the process to obtain a product with uniform characteristics. Temperature and pressure are preferably selected to be compatible with the starting materials and acids employed and in such a way that the process is complete in a reasonable amount of time for practical purposes (typically less than 72 hours).

Other specific embodiments include:

Surface-modified nanoparticles made by employing any combinations of organic acids and/or organic carboxylic acids noted herein. Surface modification methods employing any combination of two or more organic acids and/or organic carboxylic acids specifically noted herein. Surface-modified aluminum oxyhydroxide particles made by employing any combinations of organic acids and/or organic carboxylic acids noted herein. Surface modification methods applied to any pre-formed aluminum oxyhydroxide nanoparticle employing any combination of two or more organic acids and/or organic carboxylic acids specifically noted herein. Surface-modified boehmite particles made by employing any combinations of organic acids and/or organic carboxylic acids noted herein. Surface modification methods applied to any pre-formed boehmite nanoparticle employing any combination of two or more organic acids and/or organic carboxylic acids specifically noted herein.

Surface modification methods and surface-modified particles prepared by the methods wherein two or more organic acids and/or organic carboxylic acid employed exhibits solubility in water significantly different from each other. Surface modification methods and surface-modified particles prepared by the methods wherein at least one organic carboxylic acid exhibits solubility in water higher than 1% by weight and at least one carboxylic acid exhibits solubility in water less than 1% by weight. Methods herein may also employ at least one organic carboxylic acid exhibits solubility in water higher than 5% by weight and at least one carboxylic acid exhibits solubility in water less than 1% by weight.

Surface modification methods employing any two or more organic carboxylic acids wherein one of the organic carboxylic acids is a carboxylic acid having 6 or fewer carbon atoms. Surface modification methods employing any two or more organic carboxylic acids wherein one of the organic carboxylic acids is a carboxylic acid having 6 or fewer carbon atoms and one of the carboxylic acids carries a reactive group, latent reactive group or protected reactive group. Surface modification methods employing any two or more organic acids wherein one of the organic acids is benzoic acid. Surface modification methods employing any two or more organic acids wherein one of the organic acids is lactic acid. Surface modification methods employing any two or more organic acids wherein one of the organic acids is benzoic acid.

When a group of substituents is disclosed herein, it is understood that all individual members of that group and all subgroups, including any isomers and enantiomers of the group members, are disclosed separately. When a Markush group or other grouping is used herein, all individual members of the group and all combinations and subcombinations possible of the group are intended to be individually included in the disclosure. When a compound is described herein such that a particular isomer or enantiomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Specific names of compounds, if employed, are intended to be exemplary, as it is known that one of ordinary skill in the art can name the same compounds differently.

Many of the molecules disclosed herein contain one or more functional groups than can existing in ionized or protonated form [e.g., groups from which a proton can be removed (e.g., —COOH to form —COO$^-$) or added (e.g., amines) or which can be quaternized (e.g., —NH$_2$ to form —NH$_3^+$)]. All possible ionic forms of such molecules and salts thereof are intended to be included individually in the disclosure herein. With regard to salts of the compounds herein, one of ordinary skill in the art can select from among a wide variety of available counterions, those that are appropriate for preparation of salts of this invention for a given application.

Every formulation or combination of components described or exemplified herein can be used to practice the invention, unless otherwise stated.

Whenever a range is given in the specification, for example, range of molecular weights, a temperature range, a time range, or a composition or concentration range, all intermediate ranges and subranges, as well as all individual values included in the ranges given are intended to be included individually in the disclosure.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art. For example, when a compound or composition is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, including inorganic nanoparticles, organic acids, organic carboxylic acids, reagents, solid substrates, synthetic methods, purification methods, and analytical methods other than those specifically exemplified can be employed in the practice of the invention without resort to undue experimentation. All art-known functional equivalents, of any such materials and methods are intended to be included in this invention. The terms and expressions which have been employed herein are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference. In the event that there is a discrepancy in substance between subject matter in a cited reference and the disclosure herein, the disclosure herein applies. Some references provided herein are incorporated by reference to provide details concerning sources of starting materials, additional starting materials, additional reagents, additional methods of synthesis, additional methods of analysis, additional examples of organic acids for surface funcitonalization and additional uses of the invention.

THE EXAMPLES

The examples illustrate methods for forming mixed first generation surface modified boehmite nanoparticles that contain long carboxylic acids, including mono-carboxy caprolactone oligomers, mono-carboxy polyethylene oligomers, mono-carboxy polyacrylamide oligomers, and mono-carboxy siloxane oligomers. They also illustrate methods of forming mixed first generation surface modified boehmite nanoparticles that contain at least one non-reactive organic carboxylic acid and at least one reactive organic carboxylic acid. In some cases the reactive group of the reactive organic carboxylic acid is used to attach long oligomers via a second reaction to form a second generation surface modified boehmite nanoparticle. The following examples are non-limiting illustrations of some of the presently preferred embodiments of the invention.

The first three examples demonstrate the need for not exceeding the maximum desired level of carboxylic acid for making surface modified boehmite nanoparticles. For simplicity we will illustrate this concept by providing examples of particles modified with one acid rather than multiple acids. The carboxylic acid must not exceed the level where the ratio of aluminum to carboxylic acid of is less than or equal to 2 to 1 (i.e. 2:1, 3:1, 4:1 etc.). These examples (1 through 3) teach methods of preparing surface-modified boehmite nanoparticles with only one carboxylic acid, and they compare the materials produced when using a preferred carboxylic acid amount versus using more than a preferred amount of carboxylic acid. The same principle of a maximum level of carboxylic acid directly applies to mixed acid first generation surface-modified boehmite nanoparticles.

Example 1A

Preparation of Methacrylic Acid Modified Boehmite Nanoparticle (Aluminum to Acid Mole Ratio 6:1)

This example illustrates the preparation of methacrylic acid modified-pseudoboehmite at a preferred level of carboxylic acid (relative to aluminum) according to the present invention. The ratio of total aluminum atoms to acid is 6:1. This example involves only a single acid.

Pseudo-boehmite (Catapal A, Sasol, 300 g) is suspended in 600 mL of DI water under stirring. Hydroquinone (12.2 mg) is dissolved in 5 mL of acetone and this solution is mixed with methacrylic acid (61.2 g) and water (150 g). This water/methacrylic acid mixture is slowly added to the boehmite suspension. More water (885 g) is then added during the acid addition or at the end to reduce viscosity. The mixture is heated under stirring for 20 hr at 80° C. The product is spray-dried at using a spry-dryer inlet temperature of 180° C. and an outlet temperature of 60° C. The spray-dried product, a white powder, easily dispersed in water forming a white suspension at 10% wt and this suspension has some tendency to foam. The FT-IR spectrum of the product shows the typical boehmite bands at 3312, 3090, 1072, 738, 631 and 491 $cm^{-1}$, and small bands due the organic moiety. The X-RD of the product contains the typical peaks of pseudoboehmite and a few other broad peaks of low intensity. The TGA under air shows that this product has a ceramic yield of 57.3% and degrades in two steps at 71° C. (−3%, probably loss of water) and 308° C. (−39.7%, probably loss of methacrylic acid from the boehmite surface).

Example 1B

Preparation of Methacrylic Acid Modified Boehmite Nanoparticle (Aluminum to Acid Mole Ratio 1:4)

This example illustrates the preparation of methacrylic acid modified boehmite nanoparticle where the ratio of acid to aluminum is greater than the preferred ratio according to the present invention. (In this example the aluminum to acid mole ratio 1:4, i.e. the acid is more concentrated than the upper preferred limit of 1:2, aluminum to acid) This example involves only a single acid.

This example illustrates the preparation of methacrylic acid modified-pseudoboehmite according to U.S. Pat. No. 6,369,183 B1, example 13, and as described in Cook, Barron et al. [Chem. Mater. 1996, 8, 2331–2340].

Pseudo-boehmite (Catapal A, Sasol, 4 g=66.7 mmoles) was placed in a flask with xylenes (237 g) and methacrylic acid (23.3 g=270 mmoles, ratio Al:acid=1:4) and refluxed for 72 hrs under stirring. During reflux a white solid formed and separated from the solvent to the walls of the flask. The product was filtered to separate a soluble fraction from an insoluble fraction. The soluble fraction was dried to give a transparent brittle substance. This substance ignited in the presence of a flame leaving no residue after combustion, suggesting that this is poly(methacrylic acid). The residue from filtration was dried in a vacuum oven at 80° C. overnight and pulverized. Attempt to wash this residue caused clogging of the Buckner filter. The washed product was dried overnight at 70° C. The dry product, a white powder, is not soluble or dispersible in water.

The synthesis was repeated in the presence of a large amount (4000 ppm) of methoxyhydroquinone, but this was not sufficient to prevent the polymerization of the methacrylic acid under these conditions. Soluble and insoluble fractions formed again, the soluble fraction being polymethacrylic acid. The FT-IR of the insoluble fraction showed that this material contains boehmite particles and some surface polymerized methacrylic acid. The ceramic yield of this product is 23% with three degradation steps at 220° C. (−9%), 295° C. (−13.7%) and 368° C. (−54.1%). The product does not dissolve or disperse in water and settled out quickly in large agglomerates.

This example demonstrates that the materials prepared according to Cook, Barron et al. is a mixture of a polymer and particles with polymerized methacrylic acid.

Example 2A

Preparation of Lactic Acid Modified Boehmite Nanoparticle (Aluminum to Acid Mole Ratio 3:1)

This example illustrates the preparation of lactic acid modified-pseudoboehmite at a preferred level of carboxylic acid (relative to aluminum) according to the present invention. The molar ratio of total aluminum atoms to acid is 3:1. This example involves only a single acid.

Figure 5:
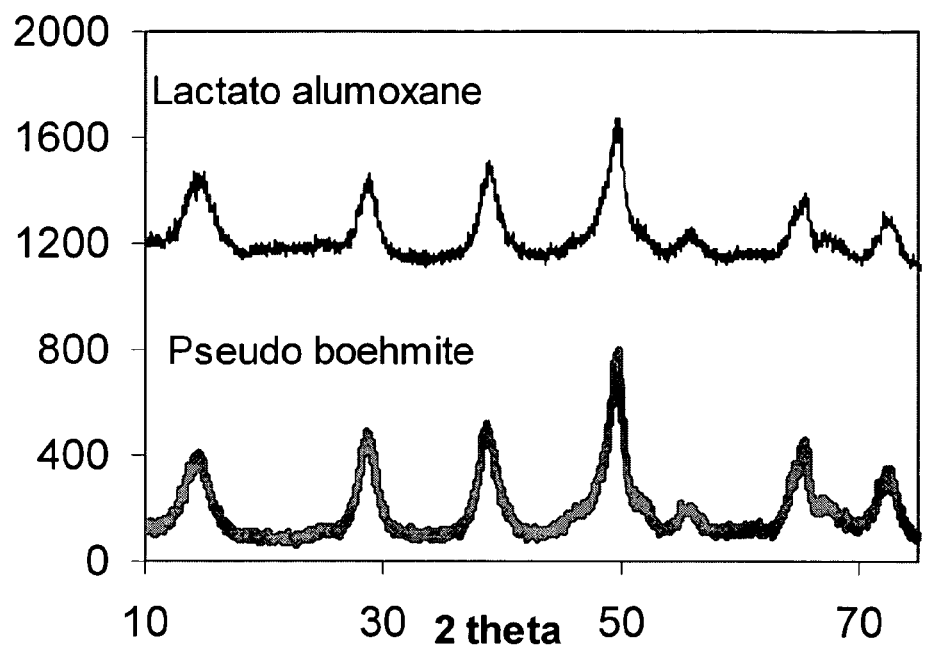
FIG. 5. Powder X-ray diffraction spectra of unmodified pseudo-boehmite nanoparticles (Catapal A, Sasol, bottom) and pseudo-boehmite nanoparticles that have been modified with lactic acid using a preferred ratio of moles of aluminum atoms to lactic acid of 3:1.

Boehmite (428 g of Catapal A, Condia Vista=6.03 mol) is suspended in 4 L of distilled water and lactic acid (213 g of 85% solution in water, Aldrich=2.01 mol). is added to the dispersion (~pH=2) and the mixture is heated overnight at 90° C. The water is then removed in an oven at ~80° C. and the resulting material (570 g) is grounded before use. The FT-IR spectrum of the product shows that the lactic acid is completely reacted. In fact, the FT-IR of the product shows no traces of the carbonyl peak of the starting lactic acid at 1735 $cm^{-1}$, but the band of the $CO_2$ group attached to the boehmite at 1642 $cm^{-1}$ and the other typical bands of pseudo-boehmite (doublet at 3312, 3090 $cm^{-1}$, singlet at 1072 $cm^{-1}$, and triplet at 738, 631 and 491 $cm^{-1}$). The dry product can be easily dispersed in water at 10% wt. concentration by sonication or severe agitation. The resulting dispersion is opaque white, strongly tixotropic, and has average particles size of 90 nm. The ceramic yield of this material as determined by thermogravimetric analysis is 55.6%. Pseudo-boehmite and lactic acid modified boehmite (called "lactato alumoxane" in FIG. 5) have almost identical X-ray diffraction spectra (FIG. 5) suggesting that during the formation of the lactic acid to boehmite bonds the crystalline structure of pseudo-boehmite is preserved. This implies that lactic acid reacts only on the surface of the particles.

To show the utility of this material we mixed one part of a 20% wt dispersion of lactic acid modified boehmite nanoparticles (aluminum to acid mole ratio 3:1) in water with two parts of an acrylic interior latex paint. The resulting paint has interesting rheological propriety including the ability of being applied in a single coat with a roller to give a three-dimensional textured coating.

Example 2B

Preparation of Lactic Acid Modified Boehmite Nanoparticle (Aluminum to Acid Mole Ratio 1:2)

This example illustrates that when using a large excess of carboxylic acid to boehmite (above the preferred level of this invention) in a water-based synthesis as described in the open literature by Barron et al., complete dissolution of the boehmite particles occurs.

Figure 6:
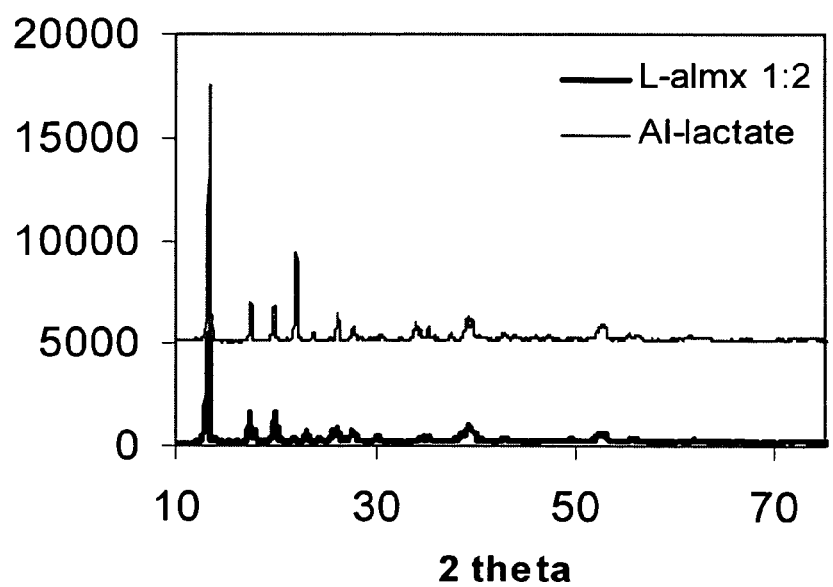
FIG. 6. Powder X-ray diffraction spectra of aluminum lactate (Aldrich, bottom) and pseudo-boehmite nanoparticles (Catapal A, Sasol) that have been modified with lactic acid using the non-preferred ratio of moles of aluminum atoms to lactic acid of 1:2 (top).

The synthesis of a lactic acid modified boehmite nanoparticle having a mole ratio of boehmite to acid: 1:2 was carried out under conditions that were similar to those employed in example 4A, and by using 428 g of boehmite and 1.28 Kg of lactic acid (85%). The product of the reaction is only partially dispersible in water. The resulting suspension is non-viscous, non-tixotropic and tends to foam under agitation. The FT-IR of the product showed no traces of the carbonyl peak of the starting lactic acid at 1735 $cm^{-1}$, but it contained a new strong band at 1618 $cm^{-1}$. However, the typical bands of pseudo-boehmite at low wavenumbers were missing. As shown in the previous example, the X-RD spectrum of lactic acid modified boehmite nanoparticle (3:1) prepared by the method of the present invention is virtually identical to the XR-D of the unreacted pseudo-boehmite suggesting that the reaction with lactic acid occurs only at the surface of the particles. In contrast, the X-RD spectrum of lactic acid modified boehmite nanoparticle (1:2) contains sharp intense peaks. By comparing the X-RD of this product with the X-RD of aluminum lactate (Aldrich, FIG. 6) we can conclude that the two materials are very similar, indicating that the lactic acid modified boehmite nanoparticle (1:2) is indeed aluminum lactate.

Example 2C

Preparation of Lactic Acid Modified Boehmite Nanoparticle (Aluminum to Acid Mole Ratio 3:2)

This example illustrates the preparation of lactic acid modified-pseudoboehmite according to U.S. Pat. No. 6,369,183 B1, example 8. The level of carboxylic acid is above a preferred amount of this invention.

Boehmite (Catapal A, Sasol 180 g) was suspended in 1.8 L of water and lactic acid (212 g, 85% wt.) was added under stirring. The mixture was refluxed overnight and the product dried by removing the water under vacuum with a rotary evaporator. The FT-IR spectrum of the product suggests that the starting lactic acid was completely reacted. TGA analysis under air of this sample shows two degradation steps at 156° C. (6.5% weight lost) and at 342° C. (52.7% weight lost). The ceramic yield of the product is 40.8%. The X-RD of the product shows both the boehmite peaks and the aluminum lactate peaks (see Example 4B) suggesting that this product is a mixture of the desired surface modified nanoparticles and the salt aluminum lactate. The intensity of the aluminum lactate peaks is about 2000 counts compared to the 12000 counts of the pure aluminum lactato. This suggests that the product obtained contains about 75% alumoxane and 15% aluminum salt.

Example 2E

Preparation of Lactic Acid Modified Boehmite Nanoparticle (Aluminum to Acid Ratio 249:1)

This example illustrates the preparation of acrylic acid modified-pseudoboehmite according to U.S. Pat. No. 4,676,928 from an acid-boehmite slurry that has a pH≧5 as defined in Claim 1. Although the level of carboxylic acid is below the upper limit defined by this invention, it is too low to sufficiently provide for dispersion in liquids, and lower than a level of a preferred embodiment of this invention. The minimum level of acid for a preferred embodiment of the present invention is 40:1, and is 20:1 for a most preferred embodiment (aluminum to acid mole ratio).

Pseudo-boehmite (Catapal A, Sasol, 42 g) was suspended in 378 mL of water. The pH of this suspension is 6.5. Lactic acid was added in enough quantity to bring the pH to 5.0 (0.243 g). The amount corresponds to a ratio of total aluminum to acid of 249:1. The mixture was refluxed under stirring for 20 hours. After cooling the majority of the product settled out of water and the material had no interesting rheological properties.

As a comparison to the product obtained in Example 2A, we prepared a suspension of this product in water at 20% wt. One part of this suspension was mixed with two parts of an acrylic latex paint for interior. The resulting paint did not form textured coatings. Furthermore the product of example 2E settles in water, while the product in 2A forms a stable suspension in water.

Example 3A

Preparation of Hydroxyl Benzoic Acid Modified Boehmite Nanoparticle (6:1)

This example illustrates the preparation—hydroxybenzoic acid modified-pseudoboehmite at a preferred level of carboxylic acid (relative to aluminum) according to the present invention. The molar ratio of total aluminum atoms to acid is 3:1. This example involves only a single acid.

Pseudo-boehmite (Catapal A, Sasol 20.15 g) was suspended in 500 mL of water under stirring and heated for 1 hr to 75° C. A solution of 4-hydroxybenzoic acid (6.56 g) in ethanol (50 mL) was added to the reaction. The mixture was heated under stirring for 21 hours, cooled to room temperature and spray dried to obtain a white powder.

Example 3B

Preparation of 4-Hydroxybenzoic Acid Modified Boehmite Nanoparticle (1:1)

This example illustrates the preparation of 4-hydroxybenzoic acid modified-pseudoboehmite according to U.S. Pat. No. 6,369,183 B1, example 2, and as described in Obray, and Barron [*Macromolecules*, 2002, 35, 1499–1503] and in Barron et al. [*Chem. Mater.*, 2000, 12, 795–804]. The level of carboxylic acid is above a preferred amount of this invention. The example involves only a single acid.

4-Hydroxybenzoic acid (549 g=3.98 moles) and a dispersion of pseudo-boehmite in water (2500 g of gel=263 g of Catapal D, =3.98 moles of Al(O)OH) are mixed and heated overnight at 90° C. The product is a white powder that slowly settles out of solution. The analysis of the FT-IR spectra of the starting material and the product shows a shoulder at 1686 $cm^{-1}$ suggesting that this sample contains a small amount of unreacted 4-hydroxybenzoic acid. This observation is confirmed by Barron et al. that observes a small peak at 1690 $cm^{-1}$ [*Macromolecules*, 2002, 35, 1499–1503, *Chem. Mater.*, 2000, 12, 795–804]. The thermogravimetric analysis (TGA) of the product under air shows that this material loses weight in one main step at 458° C. and its ceramic yield, i.e. the amount of $Al_2O_3$ formed upon heating it in air at 700° C., is 25.7% (Barron et al. observe a ceramic yield of 23%, that is reasonably close to what we obtain).

Figure 7:
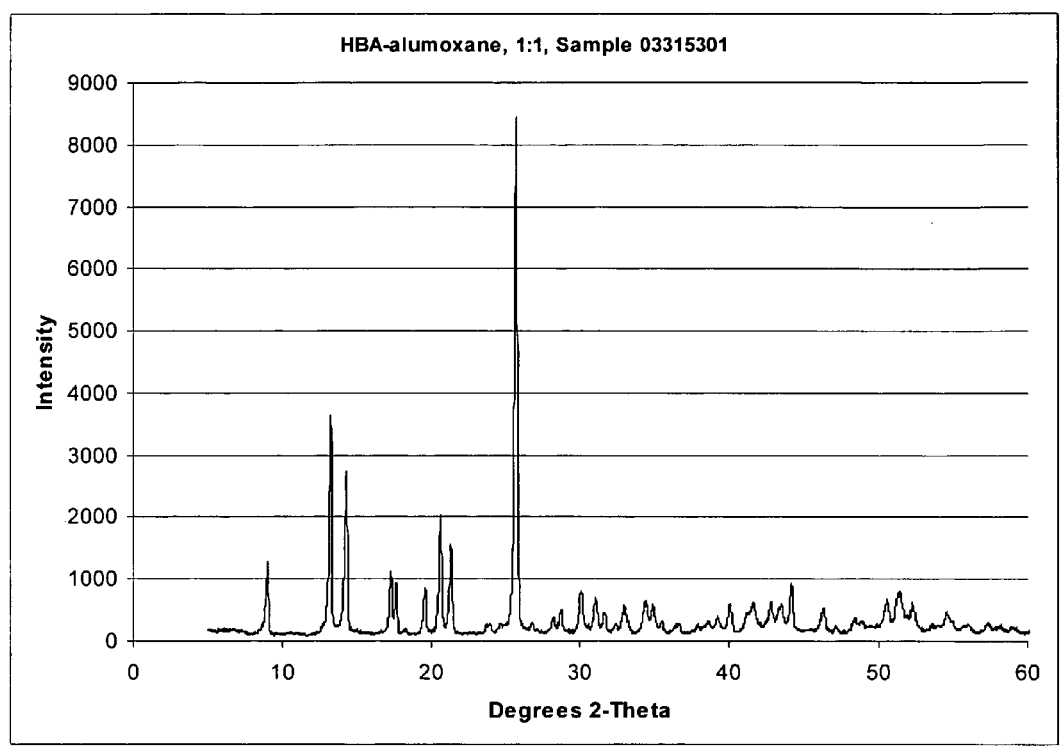
FIG. 7. Powder X-ray diffraction spectrum of pseudo-boehmite nanoparticles (Catapal A, Sasol) that have been modified with 4-hydroxybenzoic acid using the non-preferred ratio of moles of aluminum atoms to lactic acid of 1:1.
Figure 8:
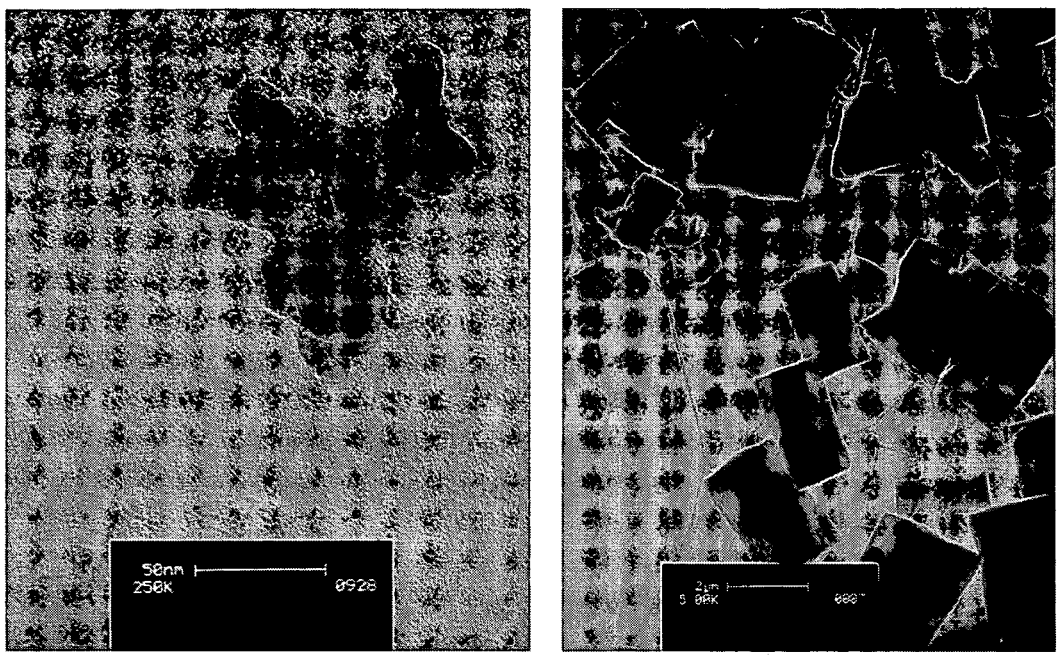
FIG. 8 TEM Images of un-modified pseudo-boehmite (Catapal A, Sasol, left) and the same pseudo-boehmite that has been reacted with one molar equivalent of 4-hydroxybenzic acid according to U.S. Pat. No. 6,369,183 B1, Example 2 (right). Note that the scale bar on the left is 50 nm and the scale bar on the right is 2 microns. The lacey-carbon grid support can be seen in the picture on the right.

The X-RD spectrum of this material shows highly crystalline peaks that are different from the peaks of the starting pseudo-boehmite indicating that a change has occurred in the structure of the particles (FIG. 7). FIG. 8 compares a transmission electron micrograph (TEM) of pseudoboehmite to a TEM image of the product. As evident by comparing the scale of the two images and the shape of the particles a significant process of dissolution of the original particles and re-crystallization into a different crystalline structure has occurred. We can conclude that the reaction of 4-hydroxybenzoato alumoxane and boehmite carried out according to the disclosed recipes in U.S. Pat. No. 6,369,183 B1, Example 2, *Macromolecules,* 2002, 35, 1499–1503, and in *Chem. Mater.,* 2000, 12, 795–804 is not a reaction of surface modification of nanoparticles but is a reaction that alters the whole crystalline identity of the starting material and generates a new species.

Example 4

Mixed Acrylic Acid and Propionic Acid First Generation/ with a Polyoxyalkylene Monoamine Oligomer Second Generation Surface Modified Boehmite Nanoparticle.

This example (with multiple variations) illustrates the formation of a mixed first generation (acrylic/propionic acid) surface modified boehmite nanoparticle followed by partial modification of the acrylic acid. The reactive double bonds of the acrylic acid are then used to form a second generation particle by bonding a polyoxyalkylene monoamine oligomer to the acrylate double bond via a Michael-type addition. This example illustrates the utility of controlling the amount of total acids used to form the first generation particle independently of controlling the relative amount of longer molecules added to form the second generation surface modification.

Variation 1 (Example 4a)

This example illustrates a first generation surface modified boehmite nanoparticle with acrylic acid (6:1 aluminum to acid mole ratio), a single acid is only used in this example. A second generation modification is then made by reacting a polyoxyalkylene monoamine oligomer to the acrylate double bond. The material made by this variation (example 4a) does not contain a mixed first generation particle, but it is described to compare the utility of the materials formed by the procedures in variation 2 (example 4b).

Acrylic acid (25.7 g, 0.36 mol) was added to 1.5 L of an 80° C. aqueous slurry containing 154.3 g (2.17 mol Al) of boehmite with a BET surface area of over 200 m$^2$/g (e.g. Catapal A from Sasol). This mixture was heated at 80° C. for 20 hours and then spray-dried in a Yamato Pulvis Model GB-21 spray drier. It can be advantageous to convert the material to a dry powder to aid in transportation, storage, and handling. The dry material (15 g, 22.2 mmol equivalents of double bond) was dispersed in 100 mL of water by gentle agitation. To this was added 44.45 g of liquid polyoxyalkylene monoamine (XTJ-507 from Huntsman, 22.2 mmol) dispersed in about 100 ml of ethanol. After 40 minutes of stirring, the material was dried to a solid in a convection oven near room temperature.

This product is easily dispersed in acrylate and urethane acrylate oligomers, including poly(ethylene glycol 200) diacrylate, and commercial urethane acrylate oligomers (i.e. sartomer CN-929 and CN-984). CN-929 is a trifunctional aliphatic urethane acrylate oligomer, and CN-984 is a difunctional aliphatic urethane acrylate oligomer.

For example, 1.84 g of the dried surface modified boehmite nanoparticle in this example can be added to 10.0 g of Poly(ethylene golycol 200) diacrylate (so that the level of surface modified boehmite nanoparticle in the oligomer is 3.51 wt % based on the inorganic portion of the nanoparticle). A uniform dispersion is made by mechanically stirring the mixture to afford a clear, golden yellow viscous liquid. To this solution was added 0.51 wt. % (0.0503 g, based on oligomer weight) of the photoinitiator, 1-hydroxycyclohexly phenylketone (1-HCPK) and the solution was pipetted into a rectangular mold (1×4×20 mm) with a glass slide as the top surface (to allow ultraviolet light to reach the sample). The samples were photopolymerize using a high pressure mercury vapor lamp containing a 320–500 nm band-pass filter and a incident light intensity of 13,000 mW/cm$^2$ and an exposure time of 2 seconds. The glass transition temperature of the resulting polymer was determined by the peak location of the tangent delta curve measured by dynamic mechanical analysis (DMA). The glass transition temperature was 83.3° C. This is compared to 81.0° C. for the glass transition temperature of poly(ethylene glycol 200) diacrylate with 0.5 wt. % 1-HCPK photopolymerized with the same lamp and conditions. The flexural modulus of the surface modified nanoparticle containing sample was 992 MPa (compared to 1674 MPa for the photopolymerized poly(ethylene golycol 200) diacrylate). The reduction in the flexural modulus is a result of the large amount of the long, flexible polyoxyalkyleneamine (XTJ-507 from Huntsman) on the surface of the nanoparticle softening the polymer surrounding the nanoparticles.

It is therefore desirable to lower the amount of the long, flexible polyoxyalkyleneamine (XTJ-507 from Huntsman) on the surface of the nanoparticle. Simply lowering the degree to which we functionalize the acrylate groups in the above example will result in having unreacted acrylate functional groups that can covalently bond to the PEG200DA network. Because the added crosslinking to the nanoparticle can change the mechanical properties, is desirable to limit the amount of these unreacted acrylate groups. One option is to lower the amount of the acrylic acid used to make the first generation surface modified boehmite nanoparticle (for example lower it to 25% of the amount used above) and then fully functionalize these acrylates to form a second generation surface modified boehmite nanoparticle (with 25% of the XTJ-507 compared to the above example). However, it is desirable to maintain a level of total acid functionalization close to (6:1 aluminum to acid) to achieve good dispersion in PEG200DA.

However, to lower this level of acrylate groups, while maintaining the same total carboxylic acid surface coverage, such that good dispersion is maintained, a surface modified boehmite nanoparticle can be made by first forming a first generation particle from propionic acid and acrylic acid and then functionalizing all or part of the acrylic acid to form a nanopartilce with 25% of the XTJ-507 as compared to the above example, but without having as high a concentration of unreacted acrylate groups on the surface. (see following example).

Variation 2 (Example 4b)

This example shows the utility of forming a first generation surface modified boehmite nanoparticle with two carboxylic acids (one which contains a reactive acrtylate group and the other which is non-reactive). Specifically a (12:1) acrylic acid surface modified and a (12:1) propionic acid surface modified boehmite nanoparticle. Additionally, a second generation surface modified boehmite nanoparticle is formed after the first generation particle is formed. Specifically a polyoxyalkylene monoamine oligomer is added to the acrylate functional groups.

Acrylic acid (13.18 g, 0.18 mol) and propionic acid (13.48 g, 0.18 mol) was added to 1.5 L of an 80° C. aqueous slurry containing 154.3 g (2.17 mol Al) of boehmite with a BET surface area of over 200 m$^2$/g (e.g. Catapal A from Sasol) (This is a 16:1 ratio for acrylic acid and a 16:1 ratio for propionic acid). This mixture was heated at 80° C. for 20 hours and then spray-dried in a Yamato Pulvis Model GB-21 spray drier. It can be advantageous to convert the material to a dry powder to aid in transportation, storage, and handling. The dry material (15 g, 10.4 mmol equivalents of double bonds) was dispersed in 100 mL of water by gentle agitation. To this was added 20.91 g of liquid polyoxyalkyleneamine (XTJ-507 from Huntsman, 10.4 mmol) dispersed in about 100 ml of ethanol. After 40 minutes of stirring, the material was dried to a solid in a convection oven near room temperature This product is easily dispersed in acrylate and urethane acrylate oligomers. For example Poly(ethylene golycol 200) diacrylate, and commercial urethane acrylate oligomers (i.e. sartomer CN-929 and CN-984). CN-929 is a trifunctional aliphatic urethane acrylate oligomer, and CN-984 is a difunctional aliphatic urethane acrylate oligomer.

For example, 0.7866 g of this dried surface modified boehmite can be added to 10.0 g of Poly(ethylene golycol 200) diacrylate (so that the level of surface modified boehmite nanoparticle in the oligomer is 3.86 wt % based on the inorganic portion of the nanoparticle). A uniform dispersion is made by mechanically stirring the mixture to afford a slightly hazy amber colored viscous liquid. To this solution was added 0.50 wt. % (0.0503 g) of 1-hydroxycyclohexly phenylketone (1-HCPK, the photoinitiator) and the solution mixture was pipetted into a rectangular mold (1×4×20 mm) with a glass slide as the top surface (to allow ultraviolet light to reach the sample). The samples were photopolymerized using a high pressure mercury vapor lamp containing a 320–500 nm band-pass filter and a incident light intensity of 13,000 mW/cm$^2$ and an exposure time of 2 seconds. The glass transition temperature of the resulting polymer was determined by the peak location of the tangent delta curve measured by dynamic mechanical analysis (DMA). The glass transition temperature was 86.8° C. This is compared to 81.0° C. for the glass transition temperature of poly (ethylene golycol 200) diacrylate with 0.5 wt. % 1-HCPK photopolymerized with the same lamp and conditions. The flexural modulus of the surface modified nanoparticle containing sample was 1554 MPa (compared to 1674 MPa for the photopolymerized poly(ethylene golycol 200) diacrylate). The reduction in the flexural modulus is much less compared to the previous example (variation 1, example 7a) because there is less of the long, flexible polyoxyalkyleneamine (XTJ-507 from Huntsman) on the surface of the nanoparticle softening the polymer surrounding the nanoparticles. Thus it is useful to provide the surface properties need to disperse the particles with the second acid (propionic acid), and thereby use only a small amount of the polyoxyalkyleneamine.

Example 5

Mixed Acrylic Acid and Hydroxy Benzoic Acid First Generation/with a Polyoxyalkylene Monoamine Oligomer Second Generation Surface Modified Boehmite Nanoparticle.

This example shows the utility of forming a first generation surface modified boehmite nanoparticle with two carboxylic acids (one which contains a reactive acrtylate group and the other, hydroxy benzoic acid, which is non-reactive (to the amine used to from the second generation) but has better solubility in organic solvents such as toluene). The acrylic acid was used at a (16:1) (aluminum to acid ratio) and the hydroxy benzoic acid was used at a (16:1) (aluminum to acid ratio) level. Additionally, a second generation surface modified boehmite nanoparticle is formed using the acrylate groups after the first generation particle is formed.

Acrylic acid (9.987 g, 0.136 mol) and hydroxy benzoic acid (18.855 g, 0.136 mol) were added to 1.5 L of an 80° C. aqueous slurry containing 154.3 g (2.17 mol Al) of boehmite with a BET surface area of over 200 m$^2$/g (e.g. Catapal A from Sasol). This mixture was heated at 80° C. for 20 hours and then spray-dried in a Yamato Pulvis Model GB-21 spray drier. It can be advantageous to convert the material to a dry powder to aid in transportation, storage, and handling. The dry material (15 g, 9.1 mmol equivalents of double bonds) was dispersed in 100 mL of water by gentle agitation. To this was added 18.2 g of liquid polyoxyalkyleneamine (XTJ-507 from Huntsman, 9.1 mmol) dispersed in about 100 ml of ethanol. After 40 minutes of stirring, the material was dried to a solid in a convection oven near room temperature This product is easily dispersed in toluene, MIBK, MEK, acetone, acetophenone, and acetonitrile. Adding surface modified boehmite nanoparticles can modify the physical properties of these liquids including the viscosity and thermal conductivity. Using multiple carboxylic acids in the first generation particle provides the ability to control the solubility of the particle (by adjusting the hydrophilicity or hydrophobicity, polarity, dispersion, etc.) and also have a reactive acrylate on some of the carboxylic acids for additional reactions. The additional reactions, used when making the second generation particles, can provide longer, steric stabilizing organic groups on the particles that prevent agglomeration of the nanoparticles.

Example 6

Mixed Methacrylic Acid and Hydroxy Benzoic Acid First Generation/with a Polyoxyalkylene Monoamine Oligomer Second Generation Surface Modified Boehmite Nanoparticle.

This example shows the utility of forming a first generation surface modified boehmite nanoparticle with two carboxylic acids (one which contains a reactive methacrylate group and the other, hydroxy benzoic acid, which is non-reactive (to the amine used to from the second generation) but has but has a hydroxyl functional group). The methacrylic acid was used at a (16:1) (aluminum to acid ratio) and the hydroxy benzoic acid was used at a (16:1) (aluminum to acid ratio) level. Additionally, a second generation surface modified boehmite nanoparticle is formed using the acrylate groups after the first generation particle is formed.

Methacrylic acid (11.931 g, 0.136 mol) and hydroxy benzoic acid (18.855 g, 0.136 mol) was added to 1.5 L of an 80° C. aqueous slurry containing 154.3 g (2.17 mol Al) of boehmite with a BET surface area of over 200 m$^2$/g (e.g. Catapal A from Sasol). This mixture was heated at 80° C. for 20 hours and then spray-dried in a Yamato Pulvis Model GB-21 spray drier. It can be advantageous to convert the material to a dry powder to aid in transportation, storage, and handling. The dry material (15 g, 8.66 mmol equivalents of double bonds) was dispersed in 100 mL of water by gentle agitation. To this was added 17.36 g of liquid polyoxyalkyleneamine (XTJ-507 from Huntsman, 8.66 mmol) dispersed in about 100 ml of ethanol to convert 100% of the methacrylate groups. After 40 minutes of stirring, the material was dried to a solid in a convection oven near room temperature

Example 7

Modification of Boehmite Particles with Branched Polycaprolactone Oligomers

Step 1.

This example illustrates the synthesis of first generation (10:1 aluminum to carboxylic acid mole ratio) propionic acid surface modified boehmite nanoparticle. This is the first step in forming a two-acid surface modified boehmite nanoparticle.

In a three-necked round-bottomed flask equipped with a mechanical stirrer and a condenser, DI-water (600 g) was heated to 75° C. Pseudo-boehmite Catapal A (Sasol, 90 g, 1.268 mole) was added with strong agitation to obtain a homogeneous dispersion. Propionic acid (9.39 g, 0.1268 mole) was slowly added to the reaction flask. The reaction mixture was stirred at 75° C. overnight. The semi-transparent mixture was spray-dried to collect the product.

Step 2.

This example illustrates the synthesis of mixed first generation (10:1 aluminum to carboxylic acid mole ratio) propionic acid and (40:1 aluminum to carboxylic acid mole ratio) Capa HC1200 surface modified boehmite nanoparticle in Ethanol/Water/Butyl Acetate. This is the second step of a two-step process.

A 14.8% wt suspension of (10:1) propionic acid modified boehmite nanoparticle (200 g, 0.256 mole) was heated with stirring to 70° C. Meanwhile, a 11.25% wt solution of Capa HC1200 (128.15 g, 0.064 mole) in butyl acetate was made by gently heating. Capa HC1200 is a dimethylolpropionic acid-initiated polycaprolactone diol having molecular weight of 2000 Dalton made by Solvay. The Capa HC1200 solution was slowly added to the reaction flask to obtain a semi-transparent mixture. After the addition, the temperature was raised to 76° C. Ethanol (397 g) was slowly added and the reaction mixture was stirred for 48 hours. The thick, white resulting mixture was cooled to room temperature. Solvents were removed by rotovap. Special care was taken not to dry the product completely. The product contains 30–60% water by weight as determined by Karl-Fisher analysis. An aliquot was dried at 100° C. and the solids content was determined to be 15.2 wt. % in n-butyl acetate. This product can be further concentrated for use into coatings by rotovap evaporation to give a paste like material with solid content of 35% by weight. This surface modified boehmite nanoparticle is added to coatings to modify the mechanical properties, improve barrier properties or modify the rheological properties of the uncured coating.

Alternate Step 2.

This example illustrates the synthesis of mixed first generation (10:1 aluminum to carboxylic acid mole ratio) propionic acid and (40:1 aluminum to carboxylic acid mole ratio) Capa HC1200 surface modified boehmite nanoparticle in Ethanol/Water. This is the second step of a two-step process.

A solution of (10:1) propionic acid modified boehmite nanoparticle (5.04 g, 6.4 $10^{-3}$ mole) in 25 mL water was heated with stirring to 70° C. Capa HC 1200 (3.2 g, 1.6 $10^{-3}$ mole) was dissolved in 20 mL hot ethyl alcohol. Samples were combined giving a white cloudy mixture. Dilution with extra 25 mL ethyl alcohol turned the sample almost transparent in color. Reaction mixture was refluxed at 90° C. for 48 hours. Most of the solvent was removed to obtain a semi-dry paste-like residue. Special attention was paid not to over dry the sample. Moist residue was completely re-suspended in ethyl acetate (~100 mL) to form a weak gel.

An aliquot was diluted with extra ethyl acetate, warmed up to 80° C., cooled in an ice bath and centrifuged for 10 minutes. Clear supernatant and gel-like precipitate were separated, dried and analyzed by FTIR. The supernatant contained a small amount of unreacted Capa HC1200. The precipitate was the purified product. The presence of Capa HC 1200 on the product was confirmed by Fourier transform infrared spectroscopy.

Alternate Step 2.

This example illustrates the synthesis of mixed first generation (10:1 aluminum to carboxylic acid mole ratio) propionic acid and (40:1 aluminum to carboxylic acid mole ratio) Capa HC1200 surface modified boehmite nanoparticle in Ethanol/Water/Ethyl Acetate. This is the second step of a two-step process.

A 1000 mL three-neck round bottom flask was equipped with a condenser, overhead stirrer, and thermocouple/heating mantle. Water (172.5 mL) was added to the flask followed by a (10:1) propionic acid modified boehmite nanoparticle (30.00 g, 38.4 mmol acid). The aqueous mixture was stirred and heated to 65° C. to disperse the nanoparticles. During this time, ethyl acetate (195 mL) was heated to 65° C. in an Erlenmeyer flask and Capa HC1200 (19.215 g, 9.6075 mmol) was dissolved in the hot ethyl acetate. Next, the HC1200/ethyl acetate solution was added to the aqueous nanoparticle dispersion. Finally, alcohol (172.5 mL) was added to the mixture and the temperature of the system was raised to 65±2° C. and allowed to react for 48 hours.

After the reaction was complete, the reaction mixture was slowly poured into approximately 2160 mL of water under rapid stirring. Once the reaction gel was added to the stirring water, the entire mixture was stirred for 30 min. At this point, the mixture can be left to settle and then decanted or it can be filtered. Once the cake from either method is collected, it is initially dried in a vented oven at room temperature for a few hours and then dried in a vacuum oven overnight at room temperature. The resulting material should be a free flowing waxy powder that can be lightly ground to break up loose agglomerates if necessary.

The precipitated powder is dispersible in chloroform and tetrahydrofuran, and it forms a homogenous gel in ethyl acetate.

Example 8

Modification of Boehmite Particles with Linear Polycaprolactone Oligomers

This example involves two steps. The first step is the synthesis of a linear polycaprolactone oligomer and the second step is the formation of the mixed carboxylic acid surface modified boehmite nanoparticle.

Step 1.

Synthesis of Linear Polycaprolactone Oligomer 2660 (LA-CAPA 2660)

Oligomer Procedure: In a 250 mL round bottomed flask, equipped with a condenser and stir bar ε-caprolactone (48.718 g), an 88.7 wt % solution of lactic acid (1.445 g), and 7 drops stannous 2-ethylhexanoate were added by syringe under Argon purge. Immediately after addition of the catalyst, some white material (polymer) appeared in the bulk mixture. The system was then placed in an oil bath at 150° C. and stirred for 6 hours. Condensation occurred on the inside of the flask throughout the reaction, possibly due to ε-caprolactone or water (formed from esterification side reaction). The initial white material disappeared after about an hour and the mixture remained clear throughout the reaction. Once the reaction was removed from the oil bath, it was poured in to a beaker and allowed to cool. Upon cooling, the solution solidified, and became a solid white mass. The sample was then placed in a storage container. Yield: 97.34 g (97%). The sample was titrated (acid/base) to obtain an estimate of molecular weight. The results show a number average molecular weight of 2660±10 g/mol. This material is a linear oligomer of polycaprolactone with a carboxylic acid group on one end.

Step 2.

This example illustrates the synthesis of mixed first generation (10:1 aluminum to carboxylic acid mole ratio) propionic acid and (40:1 aluminum to carboxylic acid mole ratio) LA-CAPA2660 surface modified boehmite nanoparticle in Ethanol/Water/Ethyl Acetate Procedure: Water (150 mL) was added to a 1 L three-neck round-bottom flask equipped with a condenser and overhead stirrer. A (10:1) propionic acid modified boehmite nanoparticle (20.00 g, 0.0256 mol acid) was dispersed in the water by stirring the mixture at 60° C. During this time, ethyl acetate (225 mL) was heated to 60° C. and LA-CAPA2660 was dissolved in the hot ethyl acetate. The ethyl acetate solution was added to the boehmite nanoparticle dispersion, forming a viscous mixture. Ethanol (260 mL) was slowly added to the mixture, causing the solution to become a milky white color. The temperature was raised to 68° C. (reflux) and allowed to react for 48 hours. The creamy-white product was then poured into a recrystallizing dish and allowed to evaporate.

Example 9

Modification of Boehmite Particles with Polyethylene Oligomers

This example involves two steps. The first step is the synthesis of a single-acid first generation surface modified boehmite nanoparticle and the second step uses the material formed in the first step and further modifies the particle with a polyethylene oligomer to form a mixed carboxylic acid surface modified boehmite nanoparticle.

Step 1.

This example illustrates the synthesis of benzoic acid surface modified boehmite nanoparticle (5:1 aluminum to acid mole ratio) in mixed solvent. This step results in the formation of a single acid modified boehmite nanoparticle. In a second step, we will then add a second high molecular weight carboxylic acid to the surface of this particle.

Benzoic acid (8.6 g, Aldrich) was dissolved in 134 g of Dowanol PM (1-methoxy-2-propanol, Aldrich). 134 ml Water and 50 g pseudo-boehmite (Catapal A, Sasol) were added to the solution and the mixture was heated to its boiling point 92° C., resulting in a rapid increase of the viscosity. Two aliquots of Dowanol PM (134 mL each) were added to lower the viscosity, and the mixture was refluxed under stirring for 2 hours. Most of the water then was removed by fractional distillation using a Dean Stark trap. During the course of the distillation more Dowanol PM was added in subsequent aliquots until the boiling point of the refluxing liquid reached 110 C or more (the total Dowanol PM added during distillation was 538 mL). This material was kept as a hot mixture to carry out the next step.

Step 2.

This example illustrated the synthesis of polyethylene mono-carboxylic acid (50:1) and benzoic acid (5:1) mixed (two acid) first generation surface modified boehmite nanoparticle.

9.86 g of a polyethylene oligomer terminated at one end with a carboxylic acid group (MW=700, Aldrich) was dissolved in 134 g of hot Dowanol PM, added to the mixture from the previous step and refluxed for 16 hours. A homogenous white emulsion was obtained. After cooling, the solvent was removed at 80 C from the product overnight. The FT-IR of the product showed clear peaks of boehmite (3310, 3093, 1072, 733, 630, and 479 cm$^{-1}$) and polyethylene (2924 and 2849 cm$^{-1}$). A fraction of the dry product was washed two times with hot xylenes and centrifuged to remove unreacted polyethylene-mono-carboxylic acid. The FT-IR spectrum of the pellet obtained from centrifugation was very similar to the FT-IR spectrum of the product obtained from synthesis and still contained intense polyethylene peaks, suggesting that the polyethylene mono-carboxylic acid is strongly bonded to the particle. Another fraction of dry product was extracted with hot xylenes in a Soxhlet for 3 hours. The FT-IR spectrum of the residue remaining in the thimble was again similar to the spectrum of the synthesis product and showed the peaks of polyethylene confirming that a considerable fraction of the starting polyethylene mono-carboxylic acid is attached to the surface of the particles.

This example shows the following points:

1) the utility of first preparing the benzoic acid surface modified boehmite nanoparticle (5:1 aluminum to acid mole ratio) in a properly selected mixed solvent system, in which the product of the reaction is dispersible. Conversely, if this surface modified nanoparticle is prepared in water, the product of the reaction is insoluble and precipitates at the end of the reaction.

2) the utility of carrying out the reaction with the polyethylene-mono-carboxylic acid starting from a pre-modified particle (benzoic acid modified) rather then boehmite. Polyethylene-mono-carboxylic acid is insoluble in water and in many water/solvent mixtures. Thus, a surface-modified particle that is soluble in a waterless solvent is needed to carry out the reaction under homogenous conditions.

Example 10

Modification of Boehmite Particles with Organosiloxane

This example illustrates the synthesis of a surface modified boehmite nanoparticle with propionic acid and a organosiloxane carboxylic acid.

A suspension of (10:1) propionic acid modified boehmite nanoparticle (10.09 g) in 150 mL water was heated to ~80° C. with stirring. The organosiloxane carboxylic acid Lambent Lube CP1 from Lambent Technologies (CP1 is a silicone carboxylate, also known as dimethicone PEG-7 Phthalate, with a specific gravity of 1.053, an acid value of 55 (mg KOH/g), an equilibrium surface tension of 27 mN/m and a critical micelle concentration of 82 mg/L) was slowly added to the hot mixture (15.8 g, 0.014 mole) under stirring. As the reaction proceeded, the product precipitated out of solution. The reaction mixture was stirred overnight, then cooled to room temperature. The product was collected by filtration and washed thoroughly with water and then with ethanol. A small aliquot was washed with more water and ethanol and centrifuged. The FT-IR spectrum of this purified fraction clearly showed strong siloxane band at 1261 and 1072 cm−1 indicating that the organosiloxane carboxylic acid is on the surface of the particles after repeated washing.

We claim:

1. A method for making surface-modified nanoparticles which comprises the step of reacting nanoparticles having a surface area (SA) greater than or equal to 20 m²/g and having a surface shell comprising at least 5% by weight of aluminum oxyhydroxide, iron oxyhydroxide, scandium oxyhydroxide, a solid solution of aluminum oxyhydroxide and iron oxyhydroxide, or mixtures thereof with one or more organic acids wherein the amount of the one or more organic acids reacted with the nanoparticles is controlled such that the molar ratio of aluminum, scandium, and iron (total metal) to total acid groups in the reaction mixture is X:1 and wherein $(25000/SA) \leq X \leq (500/SA)$.

2. The method of claim 1 wherein the one or more organic acids are organic carboxylic acids.

3. The method of claim 1 wherein two or more organic acids are reacted with the nanoparticles.

4. The method of claim 3 wherein at least one of the two or more organic acids are organic carboxylic acids.

5. The method of claim 1 wherein $(10000/SA) \leq X \leq 750/SA)$.

6. The method of claim 1 wherein $(5000/SA) \leq X \leq 1250/SA)$.

7. The method of claim 1 wherein the surface shell of the particle is aluminum oxyhydroxide.

8. The method of claim 7 wherein the aluminum oxyhydroxide is boehmite or pseudoboehmite.

9. The method of claim 1 wherein the particles have a core-shell structure.

10. The method of claim 9 wherein the core and shell of the particles are composed of the same material.

11. A surface-modified nanoparticle made by the method of claim 1 comprising one organic carboxylic acid bonded to the particle surface.

12. A surface-modified nanoparticle made by the method of claim 1 comprising two or more different carboxylic acids bonded to the particle surface.

13. A surface-modified nanoparticle having a surface area (SA) greater than or equal to 20 m²/g and having a surface shell comprising at least 5% by weight of aluminum oxyhydroxide, iron oxyhydroxide, scandium oxyhydroxide, a solid solution of aluminum oxyhydroxide and iron oxyhydroxide, or mixtures thereof which comprises: two or more different organic carboxylic acids bonded to the particle surface wherein the molar ratio of total metal to total acid groups on the surface is X:1 and wherein $(25000/SA) \leq X \leq (500/SA)$.

14. The surface-modified nanoparticle of claim 13 wherein the surface shell of the particle is aluminum oxyhydroxide.

15. The surface-modified nanoparticle of claim 14 wherein the aluminum oxyhydroxide is boehmite or pseudoboehmite or a mixture thereof.

16. The surface-modified nanoparticle of claim 13 wherein one of the organic carboxylic acids carries a reactive functional group that is not an acid group.

17. The surface-modified particle of claim 13 wherein one of the organic carboxylic acids has a molecular weight or average molecular weight greater than or equal to 500 Daltons.

18. The surface-modified particle of claim 13 wherein one of the organic carboxylic acids is selected from the group consisting of propionic acid, lactic acid, methoxyacetic acid, methoxypropionic acid, methoxyethoxy acetic acid, methoxyethoxyethoxyacetic acid (MEEA), benzoic acid, butanoic acid, pentanoic acid, and hexanoic acid.

19. The surface-modified particle of claim 13 wherein one of the organic carboxylic acids is selected from the group consisting of unsubstituted alkanoic acids having 3 to 6 carbon atoms.

20. The surface-modified particle of claim 13 wherein one of the organic carboxylic acids is benzoic acid.

21. The surface-modified particle of claim 13 which has a core-shell structure.

22. The surface-modified particle of claim 21 where the core of the particle comprises one or more metals selected from the group consisting of aluminum alloys, iron alloys, inorganic oxides, inorganic oxyhydroxides, inorganic hydrates, inorganic salts, minerals, inorganic pigments, and glasses.

23. The surface-modified particle of claim 21 wherein the core of the particle is a polymer.

24. The surface-modified particle of claim 21 where the core of the particle comprises a solid solution selected from solid solutions of iron and one or more of an aluminum oxyhydroxide, aluminum, aluminum oxide, aluminum nitride, an aluminum-containing mineral and an aluminum-containing salt and the shell is boehmite, pseudoboehmite or aluminum oxyhydroxide.

25. The surface-modified particle of claim 21 where the core of the particle comprises an organic material selected from the group consisting of a polymer, a gelatinous polymer and a swollen polymer material.

26. The surface-modified particle of claim 13 where $(10000/SA) \leq X \leq 750/SA)$.

27. The surface-modified particle of claim 13 where $(5000/SA) \leq X \leq 1250/SA)$.

28. The surface-modified particle of claim 13 which comprises at least one organic carboxylic acid with a molecular weight less than 500 Daltons, and at least one high molecular weight carboxylic acid with a molecular weight or a weight average molecular weight of equal to or greater than 500 Dalton.

29. The surface-modified particle of claim 13 which comprises at least one organic carboxylic acid with solubility in water higher than 1% by weight and at least one carboxylic acid with solubility in water less than 1% by weight.

30. The surface-modified particle of claim 13 which comprises at least one organic carboxylic acid with solubility in water higher than 5% by weight and at least one carboxylic acid with solubility in water less than 1% by weight.

31. The surface-modified particle of claim 21 which has a core and shell of the same material.

32. The surface-modified particle of claim 21 which has a surface area over 180 m²/g.

33. The surface-modified particle of claim 11 which has a surface area over 180 m2/g.

34. The surface-modified particle of claim 13 which has a surface area over 180 m2/g.

\* \* \* \* \*